(12) United States Patent
Park et al.

(10) Patent No.: US 10,681,340 B2
(45) Date of Patent: Jun. 9, 2020

(54) ELECTRONIC DEVICE AND METHOD FOR DISPLAYING IMAGE

(71) Applicant: Samsung Electronics Co., Ltd., Gyeonggi-do (KR)

(72) Inventors: Hee-Bae Park, Gyeonggi-do (KR); Woo-Taek Song, Gyeonggi-do (KR); Young-Jae Choi, Gyeonggi-do (KR); Hyuk Kang, Gyeonggi-do (KR); Tae-Ho Kim, Chungcheongbuk-do (KR); Tae-Gun Park, Gyeonggi-do (KR); Gyu-Cheol Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/834,270

(22) Filed: Dec. 7, 2017

(65) Prior Publication Data

US 2018/0160108 A1 Jun. 7, 2018

(30) Foreign Application Priority Data

Dec. 7, 2016 (KR) .......................... 10-2016-0165731

(51) Int. Cl.
*H04N 13/359* (2018.01)
*H04N 5/232* (2006.01)
(Continued)

(52) U.S. Cl.
CPC ........... *H04N 13/359* (2018.05); *G06F 1/163* (2013.01); *G06F 1/1632* (2013.01); *G06F 3/011* (2013.01);
(Continued)

(58) Field of Classification Search
None
See application file for complete search history.

(56) References Cited

U.S. PATENT DOCUMENTS 6,947,076 B1 * 9/2005 Kitaguchi ............. H04N 5/232
348/218.1
9,342,143 B1 * 5/2016 Rhodes .................. G06F 3/013
(Continued)

FOREIGN PATENT DOCUMENTS

CN 101931823 A 12/2010
CN 102300111 A 12/2011
(Continued)

OTHER PUBLICATIONS

International Search Report dated Mar. 14, 2018.
European Search Report dated May 28, 2019.
Chinese Search Report dated Apr. 22, 2020.

*Primary Examiner* — Fernando Alcon
(74) *Attorney, Agent, or Firm* — Cha & Reiter, LLC

(57) ABSTRACT

An electronic device and method are disclosed herein. The electronic device includes a display, a memory and a processor. The processor implements the method, including displaying a first image through the display, storing screen information associated with the first image in a memory, detecting whether the electronic device is mounted on the wearable device, generating a second image corresponding to a view point of the first image based on the stored screen information, and displaying the generated second image through the display.

20 Claims, 17 Drawing Sheets

(51) Int. Cl.

| | | |
|---|---|---|
| *H04N 13/344* | (2018.01) | |
| *H04N 13/172* | (2018.01) | |
| *H04N 13/194* | (2018.01) | |
| *G06F 1/16* | (2006.01) | |
| *G06F 3/01* | (2006.01) | |
| *G06F 3/14* | (2006.01) | |
| *G06F 3/0482* | (2013.01) | |
| *G09G 3/00* | (2006.01) | |

(52) U.S. Cl.
   CPC ........... *G06F 3/14* (2013.01); *H04N 5/23238* (2013.01); *H04N 5/232939* (2018.08); *H04N 13/172* (2018.05); *H04N 13/194* (2018.05); *H04N 13/344* (2018.05); *G06F 3/0482* (2013.01); *G09G 3/003* (2013.01); *G09G 2320/0613* (2013.01); *G09G 2340/0407* (2013.01); *G09G 2350/00* (2013.01); *G09G 2360/02* (2013.01)

(56) References Cited

U.S. PATENT DOCUMENTS

| | | | |
|---|---|---|---|
| 9,851,563 B2* | 12/2017 | Gao | H04N 5/2258 |
| 9,990,037 B1* | 6/2018 | Rainisto | G02B 27/0172 |
| 10,043,487 B2* | 8/2018 | Nguyen | G09G 5/363 |
| 10,067,349 B2* | 9/2018 | Chen | G02B 27/0172 |
| 10,095,461 B2* | 10/2018 | Pohl | G06F 3/1454 |
| 10,096,301 B2* | 10/2018 | Ahn | G09G 5/12 |
| 10,108,228 B2* | 10/2018 | Jiang | G06F 1/1601 |
| 10,123,434 B2* | 11/2018 | Yun | G02B 27/022 |
| 2003/0145338 A1* | 7/2003 | Harrington | H04N 7/088 |
| | | | 725/136 |
| 2005/0270313 A1 | 12/2005 | Oshio et al. | |
| 2007/0085759 A1* | 4/2007 | Lee | G06F 1/1616 |
| | | | 345/1.1 |
| 2010/0079356 A1* | 4/2010 | Hoellwarth | G02B 27/017 |
| | | | 345/8 |
| 2011/0316987 A1 | 12/2011 | Komoriya et al. | |
| 2012/0194552 A1* | 8/2012 | Osterhout | G02B 27/0093 |
| | | | 345/633 |
| 2013/0188887 A1* | 7/2013 | Chan | G06K 9/20 |
| | | | 382/312 |
| 2013/0234914 A1* | 9/2013 | Fujimaki | G06F 3/011 |
| | | | 345/8 |
| 2013/0339864 A1 | 12/2013 | Uusitalo et al. | |
| 2014/0191928 A1* | 7/2014 | Kobayashi | G02B 27/0172 |
| | | | 345/8 |
| 2014/0285403 A1* | 9/2014 | Kobayashi | G02B 27/017 |
| | | | 345/8 |
| 2015/0169335 A1 | 6/2015 | Oh et al. | |
| 2015/0234456 A1 | 8/2015 | Cho et al. | |
| 2015/0271402 A1* | 9/2015 | Guo | H04N 5/23293 |
| | | | 348/39 |
| 2016/0014418 A1* | 1/2016 | Shao | H04N 19/149 |
| | | | 375/240.02 |
| 2016/0026253 A1* | 1/2016 | Bradski | G02B 27/225 |
| | | | 345/8 |
| 2016/0062454 A1* | 3/2016 | Wang | G09G 5/003 |
| | | | 345/633 |
| 2016/0070343 A1* | 3/2016 | Li | G02B 27/0172 |
| | | | 345/633 |
| 2016/0080645 A1* | 3/2016 | Ohba | H04N 5/23229 |
| | | | 348/207.11 |
| 2016/0140887 A1* | 5/2016 | Kim | G09G 3/003 |
| | | | 345/690 |
| 2016/0286196 A1 | 9/2016 | Luthra et al. | |
| 2016/0295276 A1 | 10/2016 | Gillam | |
| 2016/0301866 A1 | 10/2016 | Kim et al. | |
| 2016/0301927 A1 | 10/2016 | Hsu et al. | |
| 2016/0342204 A1 | 11/2016 | Cho et al. | |
| 2016/0345059 A1 | 11/2016 | Xiao et al. | |
| 2017/0186236 A1* | 6/2017 | Kawamoto | G06F 21/36 |
| 2017/0316608 A1* | 11/2017 | Khalid | G06F 3/011 |
| 2018/0006762 A1* | 1/2018 | Yang | G07F 17/3211 |
| 2019/0025595 A1* | 1/2019 | Fukuda | G02B 27/0172 |

FOREIGN PATENT DOCUMENTS

| | | |
|---|---|---|
| CN | 10591726 A | 8/2016 |
| CN | 106060378 A | 10/2016 |
| EP | 3 079 346 A2 | 10/2016 |
| KR | 10-2006-0048217 A | 5/2006 |
| KR | 10-2015-0068721 A | 6/2015 |

* cited by examiner

| | Normal mode | VR mode |
|---|---|---|
| ① Gear360 resolution | 3840x1920<br>2880x1440<br>2560x1280(60fps)<br>2560x1280<br>1920x960<br>2560x1280 : default | 2880x1440 | change video resolution of Gear360 into resolution fitting VR+ device (2880*1440) |
| ② device player | Single Mono | Dual Mono | change device player to Dual Mono-Scope |
| ③ device FOV shifting method | Touch(swiping) | sensor information (motion) of Gear VR | change method for controlling FOV of device player |
| ④ Gear360 control method (e.g., capture, image, etc.) | Touch(tapping) | button of Gear VR(tapping) | change method for controlling Gear360 |

FIG.7B

ELECTRONIC DEVICE AND METHOD FOR DISPLAYING IMAGE

CLAIM OF PRIORITY

This application claims the benefit under 35 U.S.C. § 119(a) of a Korean patent application filed in the Korean Intellectual Property Office on Dec. 7, 2016 and assigned Serial No. 10-2016-0165731, the entire disclosure of which is incorporated herein by reference.

TECHNICAL FIELD

The present disclosure relates to electronic devices, and more specifically, to an electronic device and method for displaying images.

BACKGROUND

Recently, electronic devices are providing more diversified services and additional functions. To meet users' various needs and raise use efficiency of electronic devices, communication service carriers or device manufacturers are jumping into competitions to develop electronic devices with differentiated and diversified functionalities.

The advance in technology of electronic devices enables electronic devices to be worn on human bodies. Head-mounted displays (HMDs) are among such wearable electronic devices.

An HMD may be worn on the user's body part (e.g., her head) to provide a virtual reality (VR) or augmented reality (AR) environment to the user. Such VR environment may include, e.g., a display and various user interfaces (UIs) for simulating the user's physical presence.

The user may put an electronic device on a wearable device to receive content (e.g., games, movies, streaming videos, broadcasts, etc.) from the electronic device or another external electronic device (e.g., a camera capable of omni-directional image or video capture) and enjoy the content in a 360-degree environment.

SUMMARY

Conventionally, if an electronic device is mounted on a wearable device while images captured by a 360-degree camera are displayed through the electronic device, the images may not normally be displayed due to an inconsistency between the resolution of the images and the resolution of the wearable device. Further, multiple inputs are required to display images through a wearable device while the images are being displayed in a normal mode, causing user inconvenience.

Moreover, wearing a wearable device after mounting an electronic device on the wearable device while images are being displayed in the normal mode requires the user to track the screen for continuously viewing the images in a dual mode. This also leads to inconvenience.

Therefore, a need is raised for receiving images fitting the resolution of a wearable device from a camera, allowing images to be seamlessly viewed simply by mounting an electronic device on a wearable device without separate inputs, and continuously displaying the normal-mode screen in the dual mode.

The present disclosure relates to electronic devices, and more specifically, to electronic devices and methods for displaying images.

According to an embodiment of the present disclosure, an electronic device detachably mountable on a wearable device is disclosed. The electronic device includes a display, a memory, and at least one processor electrically connected with the display and the memory, the at least one processor is configured to control the display to display a first image, store screen information associated with the first image in the memory, detect whether the electronic device is mounted on the wearable device, generate a second image corresponding to a view point of the first image based on the stored screen information, and control the display to display the generated second image.

According to an embodiment of the present disclosure, a method in an electronic device mountable on a wearable device is disclosed. The method includes displaying a first image through a display, storing screen information associated with the first image in a memory, detecting whether the electronic device is mounted on the wearable device, generating a second image corresponding to a view point of the first image based on the stored screen information, and displaying the generated second image through the display.

According to an embodiment of the present disclosure, a method in an electronic device detachably mounted on a wearable device is disclosed. The method includes displaying an image in a normal mode, the image received from an external camera, in response to detecting mounting of the electronic device on the wearable device, terminating display of the image in the normal mode and transmitting resolution information about the wearable device to the external camera, and receiving an image based on the resolution information from the external camera for display in a dual mode.

Other aspects and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, such that:

FIG. 7B is a view illustrating examples of variations that are made when an electronic device switches from a normal mode to a dual mode according to an embodiment of the present disclosure;

Throughout the drawings, like reference numerals will be understood to refer to like parts, components, and structures.

DETAILED DESCRIPTION

Figure 1:
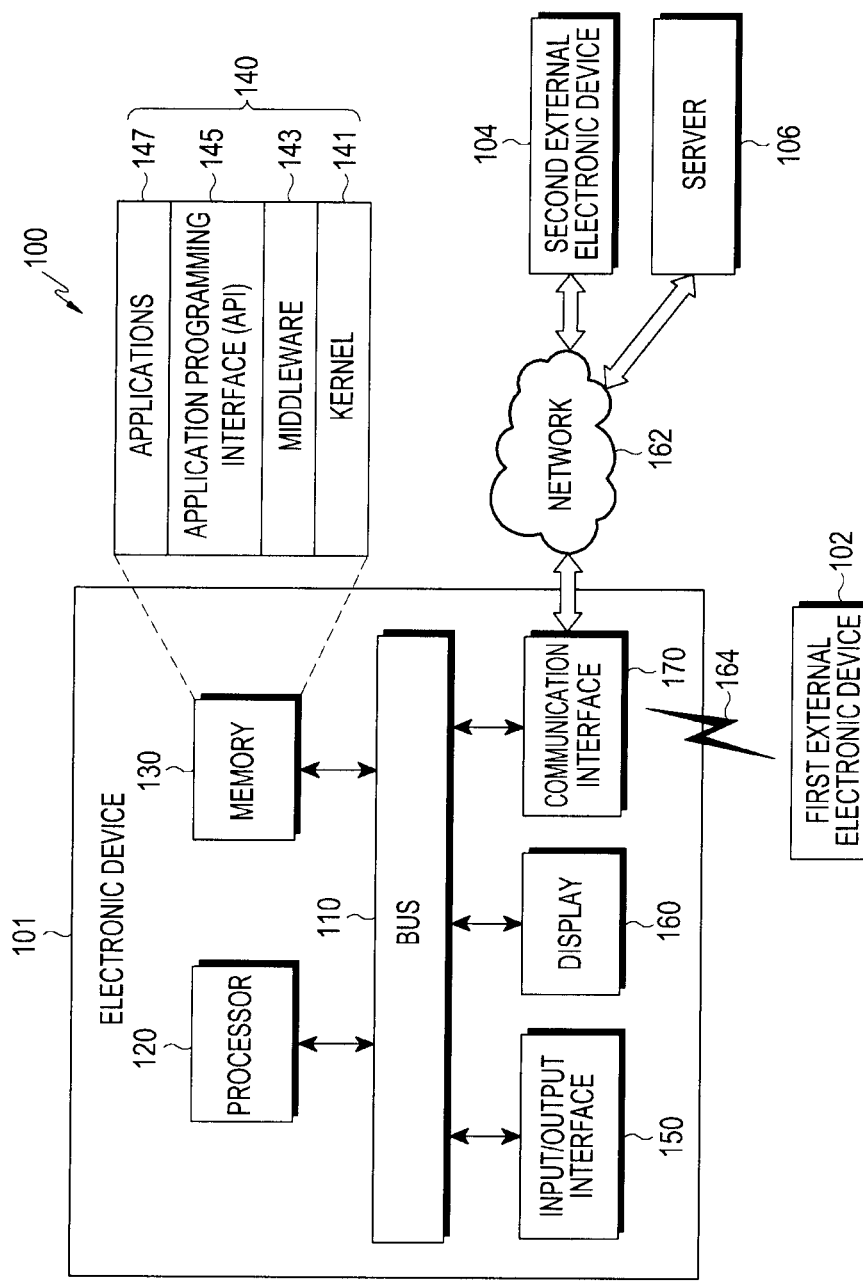
FIG. 1 is a view illustrating an electronic device in a network environment according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device or "HMD"), a fabric- or clothes-integrated device (e.g., electronic clothes), a body attaching-type device (e.g., a skin pad or tattoo), or a body implantable device (e.g., an implantable circuit).

In some embodiments, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, a charger, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electricity or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating an electronic device 101 in a network environment 100 according to an embodiment of the present disclosure.

The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of the electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106).

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), bluetooth, near-field communication (NFC). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network or "WAN"), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
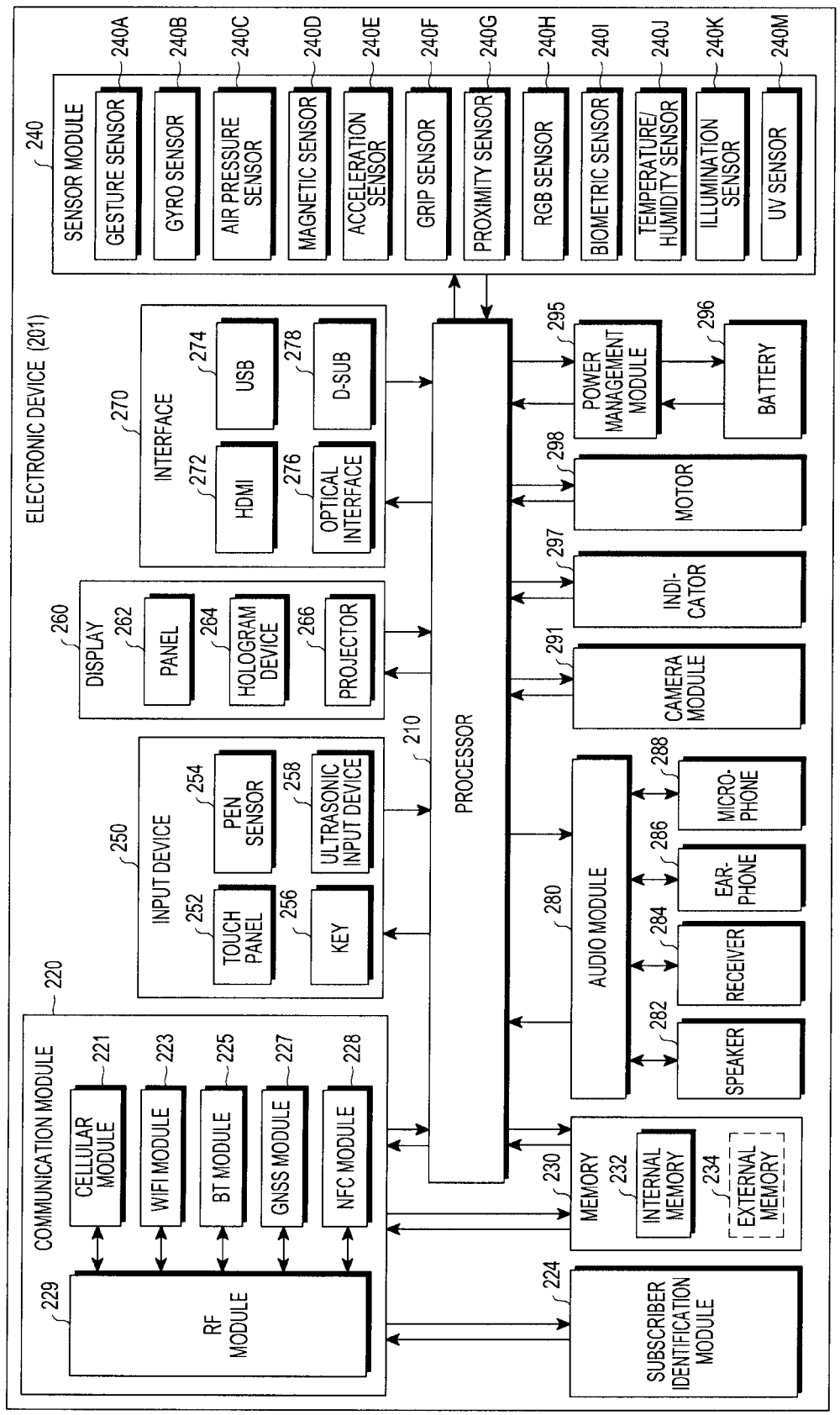
FIG. 2 is a block diagram illustrating an electronic device 201 according to an embodiment of the present disclosure.

FIG. 2 is a block diagram illustrating an electronic device 201 according to an embodiment of the present disclosure.

An electronic device 201 may include the whole or part of, e.g., the electronic device 101 of FIG. 1. The electronic device 201 may include one or more processors (e.g., application processors or "Aps") 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a RF module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth module 225, the GNSS module 227, or the NFC module 228 may include a process for, e.g., processing data communicated through the module. According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity or "IMSI").

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or keypad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 295 may manage power of the electronic device 201, for example. The electronic device 201 may be a battery-powered electronic device, but not limited thereto. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or media-Flo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
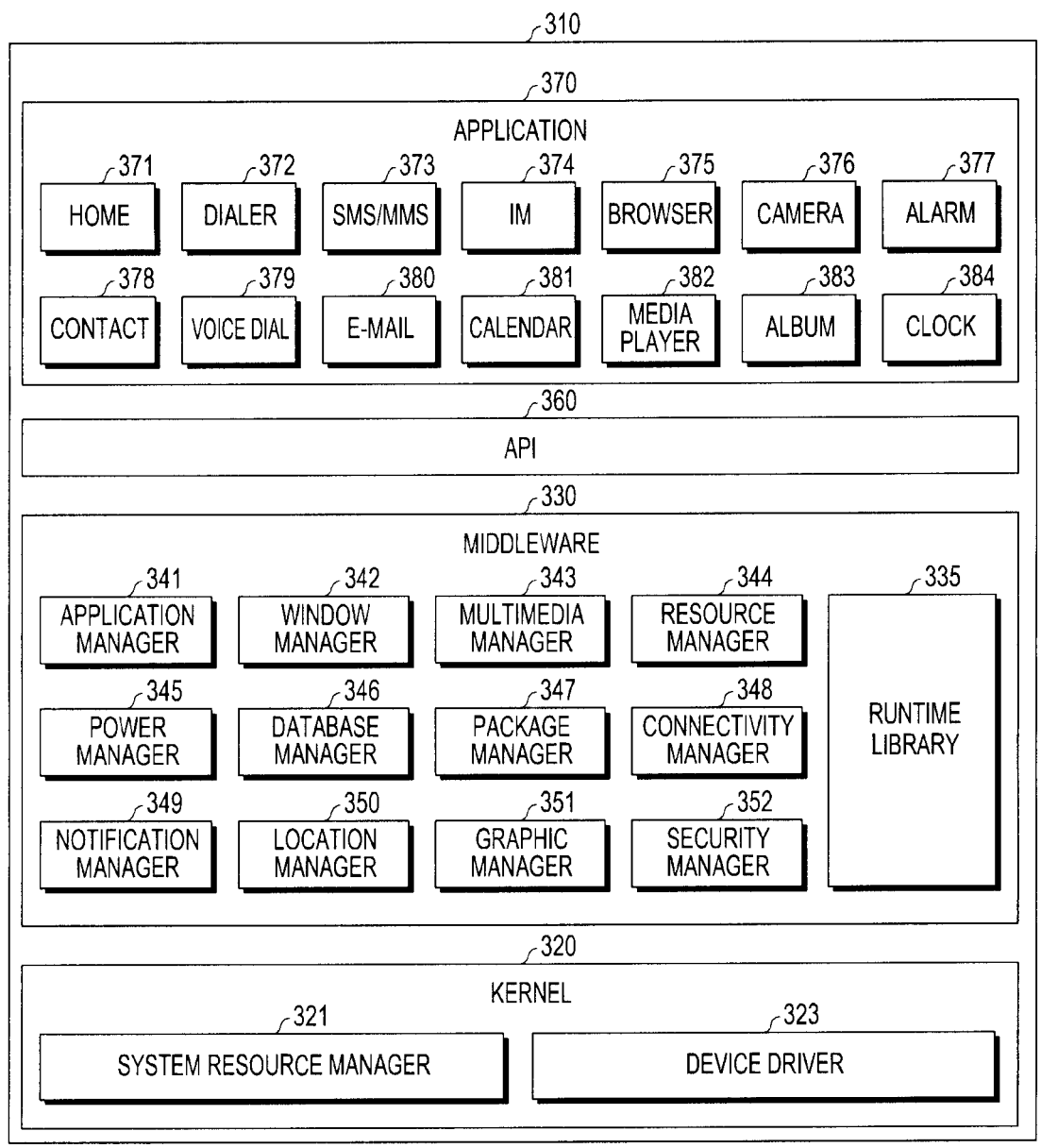
FIG. 3 is a block diagram illustrating a program module according to an embodiment of the present disclosure.

FIG. 3 is a block diagram illustrating a program module according to an embodiment of the present disclosure.

According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Samsung Bada™.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323.

The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly utilized by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats utilized to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information utilized for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions utilized for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a healthcare (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, healthcare application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

Figure 4:
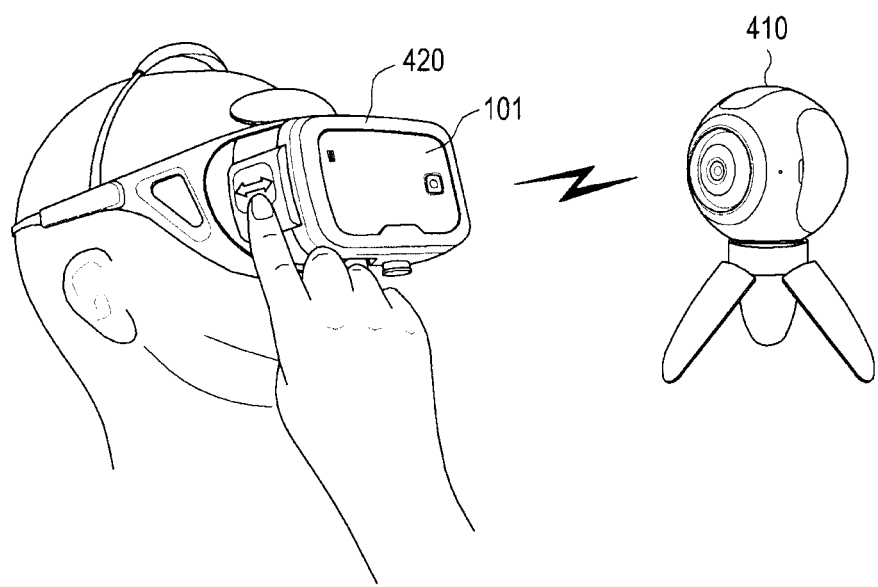
FIG. 4 is a view illustrating a system for displaying an image received from a camera through an electronic device-mounted wearable device according to an embodiment of the present disclosure.

FIG. 4 is a view illustrating a system for displaying an image received from a camera through an electronic device-mounted wearable device according to an embodiment of the present disclosure.

Referring to FIG. 4, according to an embodiment of the present disclosure, a system for displaying (or playing) an image received from a camera through an electronic device-mounted wearable device may include a camera 410 that captures and transmits the image to an electronic device 101 or a wearable device 420, the electronic device 101 that converts the image received from the camera into a three-dimensional (3D) image and displays the 3D image, and the wearable device 420 that has the electronic device 101 mounted thereon and that is worn on a user's head.

According to an embodiment of the present disclosure, the wearable device 420 may function as a free standing device in communication with the electronic device 101 or may provide a function for communicating with the electronic device 101. The wearable device 420 may include a body and a cover. When the electronic device 101 is mounted on the wearable device 420, the cover may cover an edge of a rear surface of the electronic device 101 thereby affixing it to the wearable device 420, such that the electronic device 101 remains in a secure mounted position. The wearable device 420 may further include a support for the user to attach the wearable device 420 to his head, such as a strap or other supports.

According to an embodiment of the present disclosure, the wearable device 420 may include at least two lenses each respectively corresponding to a left and right eye of the user or wearer. The user views the display of the electronic device 101 through the lenses when the electronic device 101 is mounted on the wearable device 420. Again, the wearable device 420 may include a mechanical or instrumental structure allowing the electronic device 101 to be worn as depicted in FIG. 4.

According to an embodiment of the present disclosure, the wearable device 420 may include at least one of the components of the electronic device 101 shown in FIG. 1. For example, the wearable device 420 may include at least one of a touch panel, a button, a wheel key, and a touch pad. The touch panel may receive the user's touch input. The touch input may include the user's touch on the touch panel or a hovering input near the touch panel. When the electronic device 101 is mounted, the wearable device 420 may connect with the electronic device via an interface, e.g., USB, to communicate with the electronic device 101.

According to an embodiment of the present disclosure, the electronic device 101 may control a function corresponding to an input received from the wearable device 420 in response to the input. For example, the electronic device 101 may adjust volume or control (e.g., output) the image in a dual mode (e.g., a head-mounted theater (HMT) mode) in response to the received input.

According to an embodiment of the present disclosure, the electronic device 101 may display the image received from the camera 410. The electronic device 101 may display the image received from the camera 410 through the display 160 and store screen information about the image being displayed in the memory 130. The electronic device 101 may convert the single-mode image (e.g., a two-dimensional (2D) image) received from the camera 410 into a dual-mode image (e.g., a 3D image) to generate a 3D image and display the generated 3D image. The electronic device 101, when mounted on the wearable device 420, may obtain resolution information from the wearable device 420. For example, the resolution of the wearable device 420 may include 2880×1440. The electronic device 101 may use the screen information about the single-mode image being displayed in displaying the dual-mode image.

According to an embodiment of the present disclosure, the camera 410 may include at least one lens to capture (or obtain) images. The camera 410 may simultaneously capture an ambient 360-degree image. The camera 410 may capture an image of a 360-degree view angle in real-time and wiredly or wirelessly transmit the captured image to the electronic device 101 or the wearable device 420. The camera 410 may capture the image in various resolutions to allow the image to be displayed through various electronic devices. For example, the resolutions that the camera 410 may offer may include, e.g., 3840×1920, 2880×1440, 2560×1280 (60 fps), 2560×1280, and 1920×960.

Figure 5:
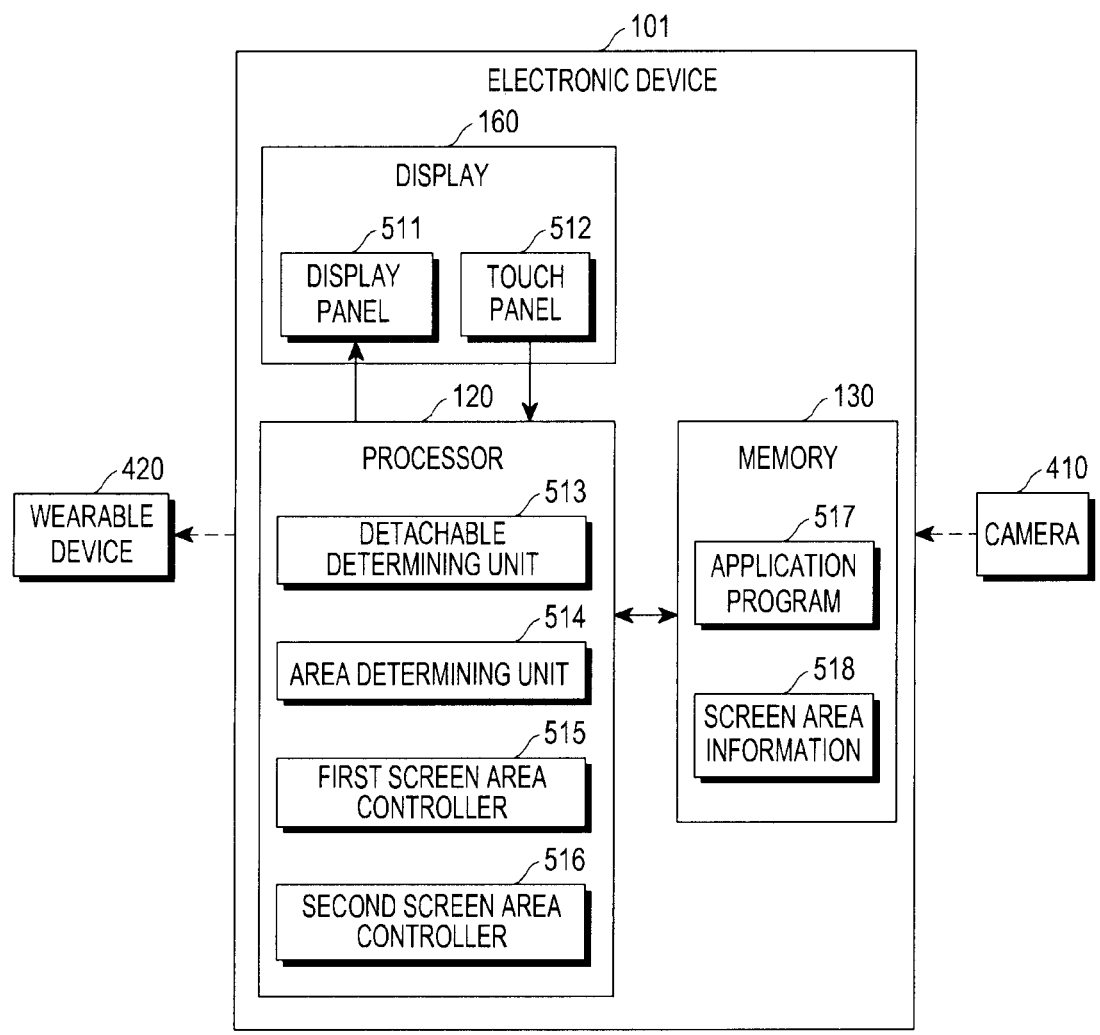
FIG. 5 is a block diagram illustrating in detail an electronic device detachably coupled to a wearable device according to an embodiment of the present disclosure.

FIG. 5 is a block diagram illustrating in detail an electronic device detachably coupled to a wearable device according to an embodiment of the present disclosure.

Referring to FIG. 5, according to an embodiment of the present disclosure, an electronic device 101 detachably coupled to a wearable device may include at least one display means. The electronic device 101 may be a device primarily performing a display function or may denote a normal electronic device including at least one display means. For example, the electronic device 101 may be an electronic device (e.g., a smartphone) having a display 160.

According to an embodiment of the present disclosure, the electronic device 101 may include at least one of a display 160, a processor 120, or a memory 130. The display 160 may include a display panel 511 and/or a touch panel 512. The processor 120 may include at least one of a detachable determining unit 513, an area determining unit 514, a first screen area controller 515, or a second screen area controller 516.

According to an embodiment of the present disclosure, when the electronic device 101 abuts, contacts, or is fastened or mounted on the wearable device 420, the electronic device 101 may operate as an HMD device. According to an embodiment of the present disclosure, the position or size of an image outputted in the dual mode through the display panel 511 of the electronic device 101 may be adjusted to be suited for the user wearing the wearable device 420. For example, when the electronic device 101 is mounted on the wearable device 420 and operated in the dual mode (e.g., the HMT mode), the dual-mode (e.g., HMT mode) image displayed through the display panel 511 may display the image received from the camera 410 as two images corresponding to the left and right eye of the user. To simultaneously capture a 360-degree image, the camera 410 may include a plurality of lenses and a memory (not shown) to store the captured image. The camera 410 may capture images based on various resolutions. The camera 410 may capture images based on a resolution requested by the electronic device 101 or resolution that the wearable device 420 supports. The camera 410 may include a communication interface (not shown) capable of wiredly or wirelessly transmitting or receiving signals or data to/from the electronic device 101.

According to an embodiment of the present disclosure, when the electronic device 101 operates in the dual mode, the processor 120 may sense a contact of the electronic device 101-equipped wearable device 420 by various methods to detect a reference point of an image and determine the area or position of the screen displayed in the dual mode based on the detected reference point.

According to an embodiment of the present disclosure, when the electronic device 101 is mounted on the wearable device 420 and is operated in the dual mode, the touch panel 512 of the electronic device 101 may detect the reference point through a contact with a conductor (e.g., a capacitive material) of the wearable device 420, which is provided on a front part that comes in contact with the display 160 of the electronic device 101. For example, when the electronic device 101 is mounted on the wearable device 420, the touch panel 512 comes in contact with the wearable device 420. Thus, the conductor of the wearable device 420 is sensed in a particular position of the touch panel 512, allowing it possible to determine where the electronic device 101 is mounted on the wearable device 420.

According to an embodiment of the present disclosure, the area determining unit 514, upon detecting the reference point from the wearable device 420, may determine the position of the screen that is to be displayed in the dual mode (e.g., the position of display of the left screen corresponding to the left eye and the position of display of the right screen corresponding to the right eye). According to an embodiment of the present disclosure, the size of the screen to be displayed in the dual mode may be determined as well. Of the entire display screen of the display panel 511, the screen area for display corresponding to the dual mode is referred to as a 'first screen area' for ease of description. At least a portion of the rest of the entire display screen of the display panel 511, except for the first screen area, is referred to as a 'second screen area.'

According to an embodiment of the present disclosure, whether the electronic device 101 operates in the dual mode may be determined by the user executing the dual mode or by the detachable determining unit 513. For example, when the electronic device 101 is mounted on the wearable device 420, the detachable determining unit 513 determines that the electronic device 101 has been mounted on the wearable device 420 and switch the electronic device 101 into the dual mode.

According to an embodiment of the present disclosure, the detachable determining unit 513 may determine that the electronic device 101 has not normally been mounted on the wearable device 420 based on the result of detection of the reference point, and the electronic device 101 or the wearable device 420 may notify the user of the result of determination through, e.g., a sound, vibration, or indication on the screen. For example, upon determining that the electronic device 101 has not properly been mounted on the wearable device 420 and the screen may not normally be displayed to the user from the result of the detection of the reference point, the user may be notified of the failure to normally mount without determining the position of screen to be displayed.

According to an embodiment of the present disclosure, the first screen area information or second screen area information determined through area determining unit 514 may be stored in the memory 130 as screen area information 518. The screen area information 518 stored in the memory 130 may be stored separately per user, so that when the user of the electronic device 101 is changed, the screen position information fitting the changed user may be read out and applied to the display of screen. The screen area information 518 may distinctively be stored depending on the type of the electronic device 101 or the type of the wearable device 420.

According to an embodiment of the present disclosure, at least one application program 517 may be stored in the memory 130. The application program 517 may be an application related to the dual mode operation of the electronic device 101. For example, according to an embodiment of the present disclosure, such an implementation may be made that when the user runs the dual mode-related application program 517, a reference point is detected from the wearable device 420 through the area determining unit 514 to determine the first screen area or the second screen area.

According to an embodiment of the present disclosure, the wearable device 420 may be any electronic device including at least one function of the electronic device 101 of FIG. 1 or may simply be a wearable stand that may hold the electronic device 101. In a case where the wearable device 420 is an electronic device, when the electronic device 101 is mounted on the wearable device 420, the wearable device 420 may provide various functions through communication with the electronic device 101. For example, when the electronic device 101 is mounted on the wearable device 420, the electronic device 101 may detect whether it has been mounted on the wearable device 420 through communication with the wearable device 420 and may determine whether to operate in the dual mode.

According to an embodiment of the present disclosure, upon failure to automatically determine whether the electronic device 101 is mounted when the electronic device 101 is mounted on the wearable device 420, the user may apply various embodiments of the present disclosure by running the application program 517 or selecting the dual mode. According to an embodiment of the present disclosure, when the wearable device 420 includes functions of the electronic device 101, the detachable determining unit 513 of the electronic device 101 may automatically determine whether the electronic device 101 is mounted on the wearable device 420 and automatically switch to the dual mode.

According to an embodiment of the present disclosure, when the electronic device 101 is operated in the dual mode while being mounted on the wearable device 420, the screen area or position may be re-determined through the above-described reference point detection at each preset time interval, in real-time, or upon meeting a preset condition, thereby updating the position of display of the screen. Information about the updated screen position may be stored in the memory 130. For example, when the mounted position of the electronic device 101 is changed by, e.g., external impacts while the user is viewing the screen in the dual mode with the electronic device 101 mounted on the wearable device 420, the screen may be provided which fits the mounted position changed through the above-described screen position update.

According to an embodiment of the present disclosure, when the first screen area and the second screen area are determined by the area determining unit 514, the first screen area controller 515 may control the determined first screen area, and the second screen area controller 516 may control the determined second screen area.

According to an embodiment of the present disclosure, the first screen area controller 515 may perform control to display the screen corresponding to the dual mode on the determined first screen area of the overall screen area of the display panel 511.

According to an embodiment of the present disclosure, the second screen area controller 516 may perform control to use the determined second screen area of the entire screen area of the display panel 511 (e.g., at least a portion of the rest of the entire screen area except for the first screen area) as an input area to control the first screen area.

According to an embodiment of the present disclosure, upon detecting the user's touch or gesture in an area corresponding to the second screen area of the entire screen area of the touch panel 512 of the display 160, the second screen area controller 516 may perform control to perform a preset input function (e.g., a function for controlling the dual mode in the second screen area).

According to an embodiment of the present disclosure, the second screen area controller 516 may perform control to use the determined second screen area of the entire screen area of the display panel 511 as a separate display area. For example, the second screen area controller 516 may perform control to display various soft keys (e.g., a play, pause, terminate, fast-forward, rewind, or volume key) to control the dual mode on the second screen area. According to an embodiment of the present disclosure, the second screen area controller 516 may perform control to provide various information (e.g., at least one icon for executing the application, weather information, date information, day information, schedule information, received call information, received text information, various status information, or news information) that the electronic device 101 provides separately from the dual mode on the second screen area.

At least some functions of the processor 120 of FIG. 5 may be included in the display 160 or the processor 120 of FIG. 1. The display 160 or display panel 511 of FIG. 5 may correspond to the display 160 of FIG. 1. The memory 130 of FIG. 5 may correspond to the memory 130 of FIG. 1.

Although FIG. 5 illustrates the display panel 511 and the touch panel 512 as the display 160, the display panel 511 and the touch panel 512 may be provided as separate panels, rather than as a single display 160, according to an embodiment of the present disclosure.

According to an embodiment of the present disclosure, an electronic device detachably mounted on a wearable device may include a display, a memory, and at least one processor electrically connected with the display and the memory, such that the at least one processor may be configured to display a first image through the display, store screen information about the first image in the memory, sense whether the electronic device is mounted on the wearable device, generate a second image corresponding to a view point of the first image based on the stored screen information about the first image, and display the generated second image through the display.

According to an embodiment of the present disclosure, the processor may be configured to temporarily terminate displaying the first image based on sensing an input to temporarily terminate the first image being displayed while displaying the first image in a first mode and store the screen information about the first image temporarily stopped.

According to an embodiment of the present disclosure, the processor may be configured to, when the electronic device is mounted on the wearable device, convert the first image into the second image based on the stored screen information to be displayed in a second mode. The first mode may be a mode for displaying the image in a single mode, and the second mode may be a mode for displaying the image in a dual mode.

According to an embodiment of the present disclosure, the screen information may include at least one of a time of display of the first image and coordinates of a center of the first image temporarily stopped. The processor may be configured to display the second image having a view point corresponding to the view point of the first image using the time of display of the first image, the coordinates of the center of the first image temporarily stopped, or a combination thereof.

According to an embodiment of the present disclosure, the processor may be configured to obtain resolution information about the wearable device based on the mounting of the electronic device on the wearable device and transmit the obtained resolution information to an external camera.

According to an embodiment of the present disclosure, the processor may be configured to receive an image from the external camera based on the transmitted resolution information, execute an application for displaying the received image in three-dimensional (3D), and display the received image in 3D using the executed application.

According to an embodiment of the present disclosure, the processor may be configured to receive the first image from the external camera that simultaneously captures a screen having a 360-degree view angle. The first image may include an image captured in real-time by the external camera or an image pre-stored in the external camera.

According to an embodiment of the present disclosure, the processor may be configured to, based on wireless connection between the electronic device and the wearable device, receive image information about the wearable device from the wearable device, transmit the received image information about the wearable device to an external camera, receive an image based on the image information about the wearable device from the external camera, and transmit the received image to the wearable device.

According to an embodiment of the present disclosure, the processor may be configured to include, in the image information about the wearable device, a command to enable the image transmitted from the external camera to directly be transmitted to the wearable device and transmit the image information about the wearable device to the external camera.

According to an embodiment of the present disclosure, the input may include at least one of an input through a power key, an input by touching or tapping on the display, or an input through a menu provided from an application for displaying the first image.

According to an embodiment of the present disclosure, the processor may be configured to sense the wearable device being worn on a user's head while the first image is temporarily stopped corresponding to sensing the input, sense a movement of the wearable device, and release the temporary stopping of the first image.

Figure 6A:
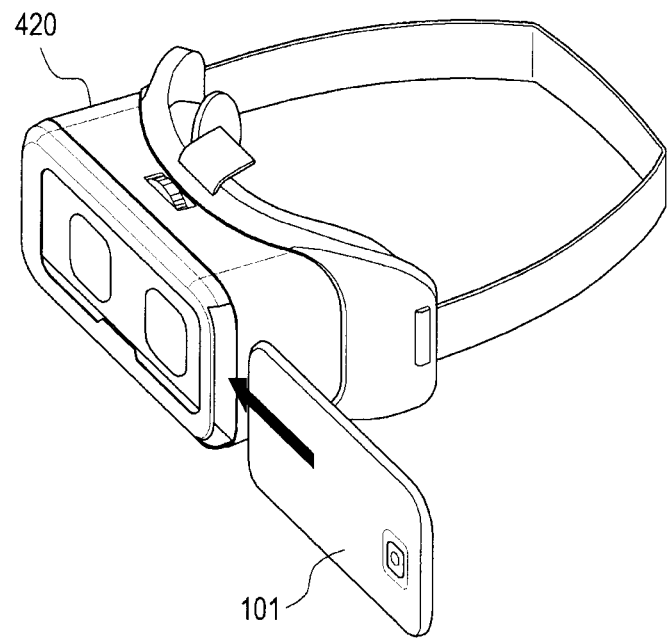
FIG. 6A is a view illustrating an example of a wearable device where an electronic device is mountable according to an embodiment of the present disclosure.
Figure 6B:
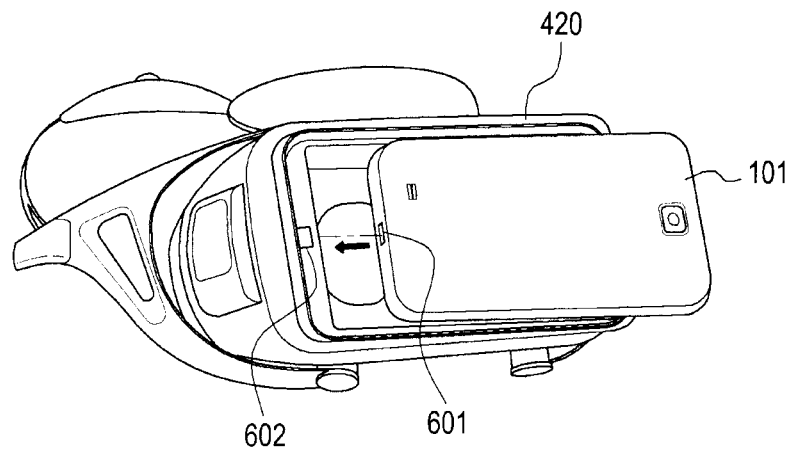
FIG. 6B is a view illustrating an example of mounting an electronic device on a wearable device according to an embodiment of the present disclosure.
Figure 6C:
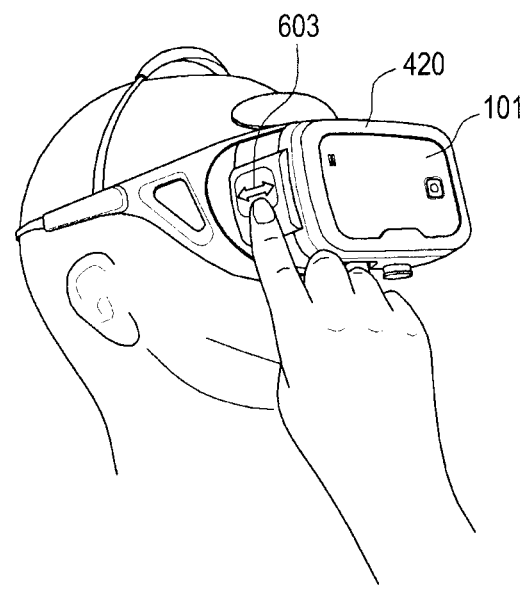
FIG. 6C is a view illustrating an example of wearing an electronic device-mounted wearable device according to an embodiment of the present disclosure.
Figure 6D:
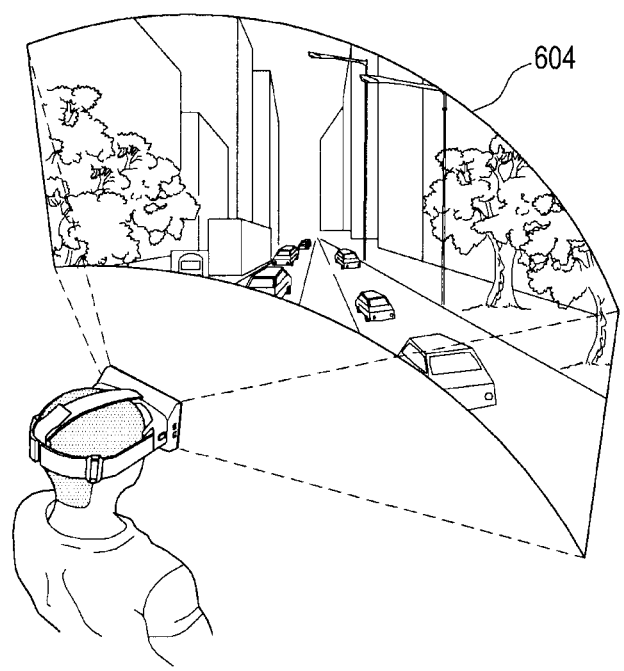
FIG. 6D is a view illustrating an example in which a user views an image using a wearable device according to an embodiment of the present disclosure.

FIG. 6A is a view illustrating an example in which an electronic device is mounted to a wearable device according to an embodiment of the present disclosure. FIG. 6B is a view illustrating an example of mounting an electronic device on a wearable device according to an embodiment of the present disclosure. FIG. 6C is a view illustrating an example of wearing an electronic device-mounted wearable device according to an embodiment of the present disclosure. FIG. 6D is a view illustrating an example in which a user views an image using a wearable device according to an embodiment of the present disclosure.

Referring to FIG. 6A, a wearable device 420 may include a body and a cover. The wearable device 420 may be formed to have an electronic device 101 mounted thereon. When the electronic device 101 is mounted on the wearable device 420, the cover may cover the edge of a rear surface of the electronic device 101 to be fastened to the wearable device 420 so that the electronic device 101 may remain in a mounted position as shown. The wearable device 420 may have a support available for the user to wear the wearable device 420 on his head.

The wearable device 420 may have a plurality of lenses corresponding to both eyes of the user (wearer). The user may view the display (not shown) of the electronic device 101 through the lenses with the electronic device 101 mounted on the wearable device 420. The wearable device 420 may have a mechanical or instrumental structure allowing the electronic device 101 to be mounted thereon as shown.

According to an embodiment of the present disclosure, the wearable device 420 may include at least one of the components of the electronic device 101 shown in FIG. 1. For example, the wearable device 420 may include at least one of a touch panel, a button, a wheel key, and a touch pad. The wearable device 420 may include a memory (not shown), a processor (not shown), and a communication interface (not shown). The touch panel may receive the user's touch input. The touch input may include the user's touch on the touch panel or a hovering input near the touch panel. When the electronic device 101 is mounted on the wearable device 420, the wearable device 420 may communicate with the electronic device 101 via an interface, e.g., universal serial bus (USB), or a wireless protocol. The wearable device 420 may wirelessly be connected with the electronic device 101 to perform communication, or the wearable device 420 may wirelessly be connected with the camera 410 to receive images from the camera 410.

The electronic device 101 may control a function corresponding to an input received from the wearable device 420 in response to the input. For example, the electronic device 101 may adjust volume or control (e.g., output) the image in a dual mode (e.g., a head-mounted theater (HMT) mode) in response to the received input.

Referring to FIG. 6B, the wearable device 420 may cover the edge of a rear surface of the electronic device 101 to be fastened to the wearable device 420 so that the electronic device 101 may remain in a mounted position. The wearable device 420 may have a support available for the user to wear the wearable device 420 on his head.

The wearable device 420 may have lenses respectively corresponding to both eyes of the user (wearer). The user may view the display (not shown) of the electronic device 101 through the lenses with the electronic device 101 mounted on the wearable device 420. The wearable device 420 may have a mechanical or instrumental structure allowing the electronic device 101 to be mounted thereon as shown.

The electronic device 101 may control a function corresponding to an input received from the wearable device 420 in response to the input. For example, the electronic device 101 may adjust volume or control (e.g., output) the image in a dual mode (e.g., a head-mounted theater (HMT) mode) in response to the received input. For example, when the electronic device 101 is mounted on the wearable device 420, the external device connecting unit 601 of the electronic device 101 may be electrically connected with the connecting unit 602 of the wearable device 420 to enable communication between the devices.

Referring to FIG. 6C, the electronic device 101 may refer to the electronic device 101 of FIG. 1, which in some embodiments is a smartphone having a display means. The wearable device 420 may be a first external electronic device 101 as shown in FIG. 1 or may be an instrumental, wearable mount or stand.

The electronic device 101 may be mounted on the wearable device 420 with the display 160 (e.g., a touchscreen) of the electronic device 101 oriented towards the user's face as shown in FIG. 6C. The user may secure the electronic device 101 to the wearable device 420 by closing the cover of the wearable device 420. The user may then place the electronic device 101-mounted wearable device 420 on her head. The user may view a screen generated on the display of the electronic device 101 through the lenses of the wearable device 420. The user may control the functions of the electronic device 101 or the functions of the wearable device 420 through the touch pad 603 provided in a side surface of the wearable device 420.

Referring to FIG. 6D, the user may mount the electronic device 101 on the wearable device 420, viewing an image 604. The image may be an image stored in the electronic device 101 or an image received from the camera 410. The electronic device 101 may output the image to be shown in 3D through at least two lenses provided in the wearable device 420.

Figure 7A:
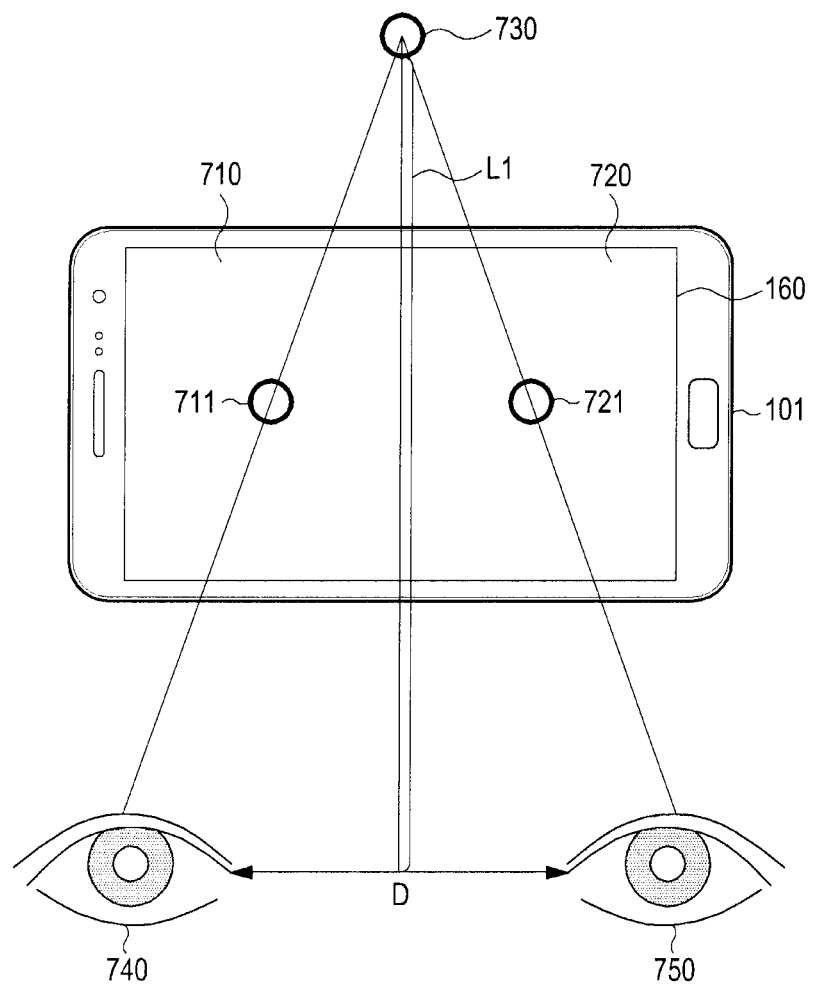
FIG. 7A is a view illustrating an example of outputting an image based on a dual mode using an electronic device according to an embodiment of the present disclosure.
Figure 7C:
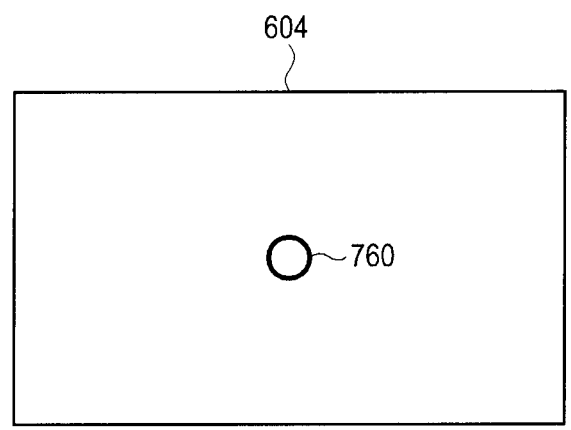
FIG. 7C is a view illustrating an example of an image that a user views through an electronic device-mounted wearable device according to an embodiment of the present disclosure.

FIG. 7A is an example view illustrating output of an image based on a "dual mode" using an electronic device according to an embodiment of the present disclosure. FIG. 7B is a view illustrating examples of variations that are made when an electronic device switches from a normal mode to a dual mode according to an embodiment of the present disclosure. FIG. 7C is a view illustrating an example of an image that a user views through an electronic device-mounted wearable device according to an embodiment of the present disclosure.

Referring to FIG. 7A, the electronic device 101 may display a left-eye image 710 and a right-eye image 720 on the display 160. The left-eye image 710 may include a first object 711, and the right-eye image 720 may include a second object 721. Here, the left-eye image 710 (or the first object 711) may correspond to the left eye 740, and the right-eye image 720 (or the second object 721) may correspond to the right eye 750. Referring to FIG. 7A, the inter-pupillary distance (IPD), which is the distance between the left eye 740 and the right eye 750, may be D. The left-eye image 710 and the right-eye image 720, respectively, may correspond to the user's left and right eye and may be images allowing the user to view images while feeling a depth. According to an embodiment of the present disclosure, the left-eye image 710 and the right-eye image 720 may be images for a VR service and may be images configured to provide a stereoscopic effect for a portion of an overall screen for a VR service. For example, the left-eye image 710 and the right-eye image 720 may be formed to be different from each other to present a depth effect. The user may perceive an illusion of depth as she observes different images through her eyes.

The electronic device 101 may display the first object 711 and the second object 721 with them spaced apart from each other at a predetermined distance. The user may determine that an object image 730 is present at a point where a straight line passing through the left eye 740 and the first object 711 crosses a straight line passing through the right eye 750 and the second object 721. For example, the user may observe the presence of the object at a point that is positioned away from the user by L1.

Referring to FIG. 7B, the camera 410 may perform conversion into a resolution suitable for the electronic device 101 and transmit streaming data or content to the electronic device 101. The electronic device 101 may display the streaming data or content received from the camera 410 in the normal mode or dual mode. The electronic device

101 may display the streaming data or content received from the camera 410 in any one resolution of 3840×1920, 2880×1440, 2560×1280 (60 fps), 2560×1280, and 1920×960. The electronic device 101 may display the streaming data or content received from the camera 410 in 2880×1440 in the dual mode. The electronic device 101 may switch the normal-mode screen into the dual-mode screen with left and right eye images 710 and 720 and display the streaming data or content. In the normal mode, the electronic device 101 may control the streaming data or content being displayed based on a touch (e.g., swiping or tapping). In the dual mode, the electronic device 101 may control the streaming data or content being displayed based on a movement of the electronic device 101-mounted wearable device 420 or a button input. In the normal mode, the electronic device 101 may move the screen based on swiping and control the capture or menu of the camera 410 based on tapping. In the dual mode, the electronic device 101 may move the screen through a movement of the electronic device 101-mounted wearable device 420 and control the capture or menu of the camera 410 based on tapping.

Referring to FIG. 7C, the user may view an image including an object 760. The electronic device 101 may operate the display 160 in the dual mode to output the left-eye image 710 and the right-eye image 720. The user may recognize as if the left-eye image 710 and the right-eye image 720 are outputted as a single image 604 through the two lenses provided in the wearable device 420.

Figure 8:
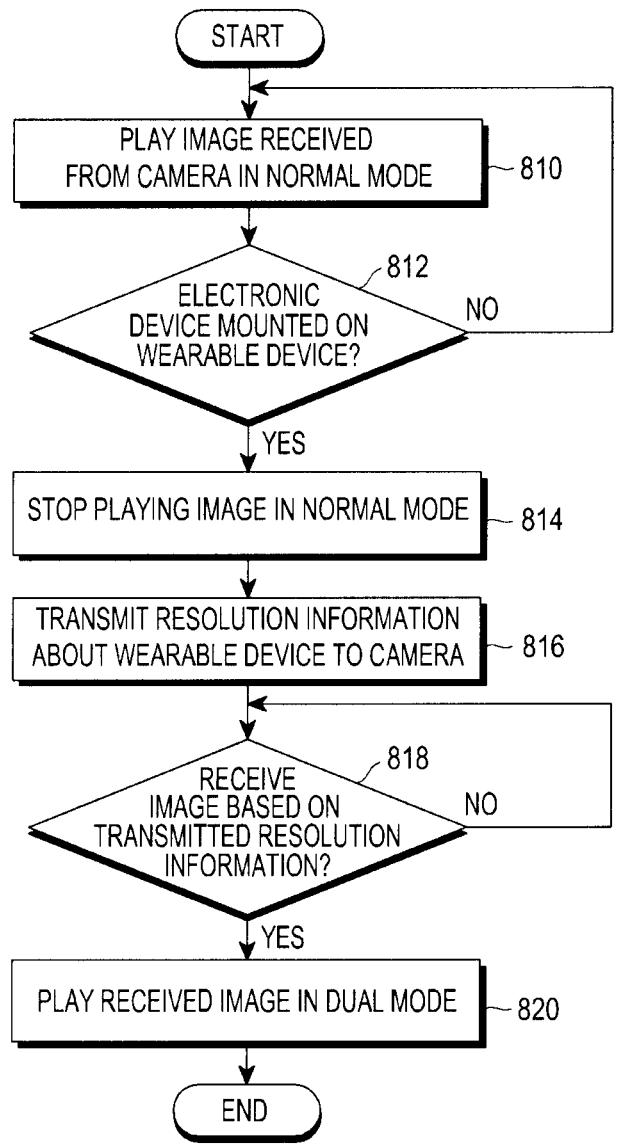
FIG. 8 is a flowchart illustrating a process for displaying an image by an electronic device detachably coupled to a wearable device according to an embodiment of the present disclosure.

FIG. 8 is a flowchart illustrating a process for displaying an image by an electronic device detachably coupled to a wearable device according to an embodiment of the present disclosure.

FIG. 8 illustrates an example process for displaying an image by an electronic device detachably coupled to a wearable device according to an embodiment of the present disclosure.

In operation 810, an electronic device 101 may display an image received from a camera in a normal mode. The electronic device 101 may receive an image captured by the camera 410, or one pre-stored in the camera 410, and display the received image through the display 160. The image received from the camera 410 may include an image implementing a 360-degree view angle captured in real-time by the camera 410, or an image pre-stored in a memory (not shown) of the camera 410. The electronic device 101 may receive the image from the camera 410 using network streaming, and display the image through the display 160.

In operation 812, the electronic device 101 may detect whether the electronic device 101 is mounted on a wearable device. The wearable device 420 may include a body and a cover. The wearable device 420 may be formed to have an electronic device 101 mounted thereon. When the electronic device 101 is mounted on the wearable device 420, the cover may cover the edge of a rear surface of the electronic device 101 to be fastened to the wearable device 420 so that the electronic device 101 may remain in a mounted position. The wearable device 420 may have a support available for the user to wear the wearable device 420 on his head. As an external device connector 601 of the electronic device 101 is electrically connected to a connector 602 of the wearable device 420, the electronic device 101 may sense that the electronic device 101 is mounted on the wearable device 420 and may communicate with the wearable device 420 through the external device connector 601.

In operation 814, the electronic device 101 may stop displaying the image in the normal mode upon sensing the mounting on the wearable device 420. The electronic device 101 may stop (e.g., temporarily stop) displaying the image in the normal mode. Upon sensing the mounting on the wearable device 420, the electronic device 101 may obtain information about the resolution of the wearable device 420 from the wearable device 420. When the electronic device 101 is mounted on the wearable device 420, the electronic device 101 may receive a transmission regarding the resolution information of the wearable device 420 from the wearable device 420 through the external device connector 601 or through a wireless protocol with the wearable device 420. The wearable device 420 may include a communication interface (not shown) for wired/wireless communication with the electronic device 101, a memory (not shown) for storing images, and a processor (not shown) for controlling the wired/wireless communication with the electronic device 101 and the display of images. Upon sensing the mounting on the wearable device 420, the electronic device 101 may send a request for resolution information of the wearable device 420 to the wearable device 420 and receive the resolution information corresponding to the request.

In operation 816, the electronic device 101 may transmit the resolution information of the wearable device to the camera. The electronic device 101 may transmit the resolution information obtained from the wearable device 420 to the camera 410. The electronic device 101 may transmit wearable device information including resolution information including various resolutions supportable by the wearable device 420 for display of imagery to the camera 410. The wearable device information may include various pieces of information utilized to directly receive images from the camera 410, such as the resolution information, product information about the wearable device, function information, or prefix information of a communication interface for transmission or reception of images.

In operation 818, the electronic device 101 may receive images based on the transmitted resolution information. The electronic device 101 may transmit the wearable device information including the resolution information of the wearable device 420 to the camera 410 and may receive an image based on the transmitted resolution information from the camera 410. The camera 410 may determine an optimal resolution for displaying an image through the wearable device 420 based on at least one of the received resolution information, wearable device product information, function information, and prefix information of communication interface for transmission/reception of images. The camera 410 may transmit an image based on the determined resolution to the electronic device 101. The electronic device 101 may receive, from the camera 410, an image corresponding to the resolution determined based on the transmitted resolution information. The received image may be an image having an optimal resolution for display on the wearable device 420.

In operation 820, the electronic device 101 may display the received image in 'dual mode." Upon transmitting the resolution information to the camera 410 or receiving an image with the optimal resolution, the electronic device 101 may execute an application utilized for displaying the received image in the dual mode (e.g., the HMT mode). The electronic device 101 may display the received image through the executed application. The electronic device 101 may convert the received image to be displayed based on the HMT mode. The electronic device 101 may display a left-eye image 710 and a right-eye image 720 on the display 160 based on the converted image. The left-eye image 710 may correspond to the left eye 740, and the right-eye image 720 may correspond to the right eye 750. The left-eye image 710 and the right-eye image 720, respectively, may correspond to the user's left and right eye and may be images allowing the user to view images while perceiving an illusion of depth. According to an embodiment of the present disclosure, the left-eye image 710 and the right-eye image 720 may be images for a VR service and may be images configured to provide a stereoscopic effect for a portion of an overall screen for a VR service. For example, the left-eye image 710 and the right-eye image 720 may be formed to be different from each other to present a depth effect. The user may experience an illusion of depth perception as she observes different images through her eyes. As set forth above, when the electronic device 101 is mounted on the wearable device 420 while displaying the image received from the camera 410 in the normal mode, the electronic device 101 may execute an application for displaying images in the dual mode (e.g., the HMT mode) and display the received image through the executed application. The electronic device 101 may store the screen information about the image in the memory 130 while displaying the image received from the camera 410 in the normal mode, and when mounted on the wearable device 420, the electronic device 101 may generate, based on screen information about a first image stored, a second image corresponding to the view point of the first image and display the generated second image through the display 160. The view point may include at least one of the focus, direction, angle of view, and screen size of the image.

Figure 9:
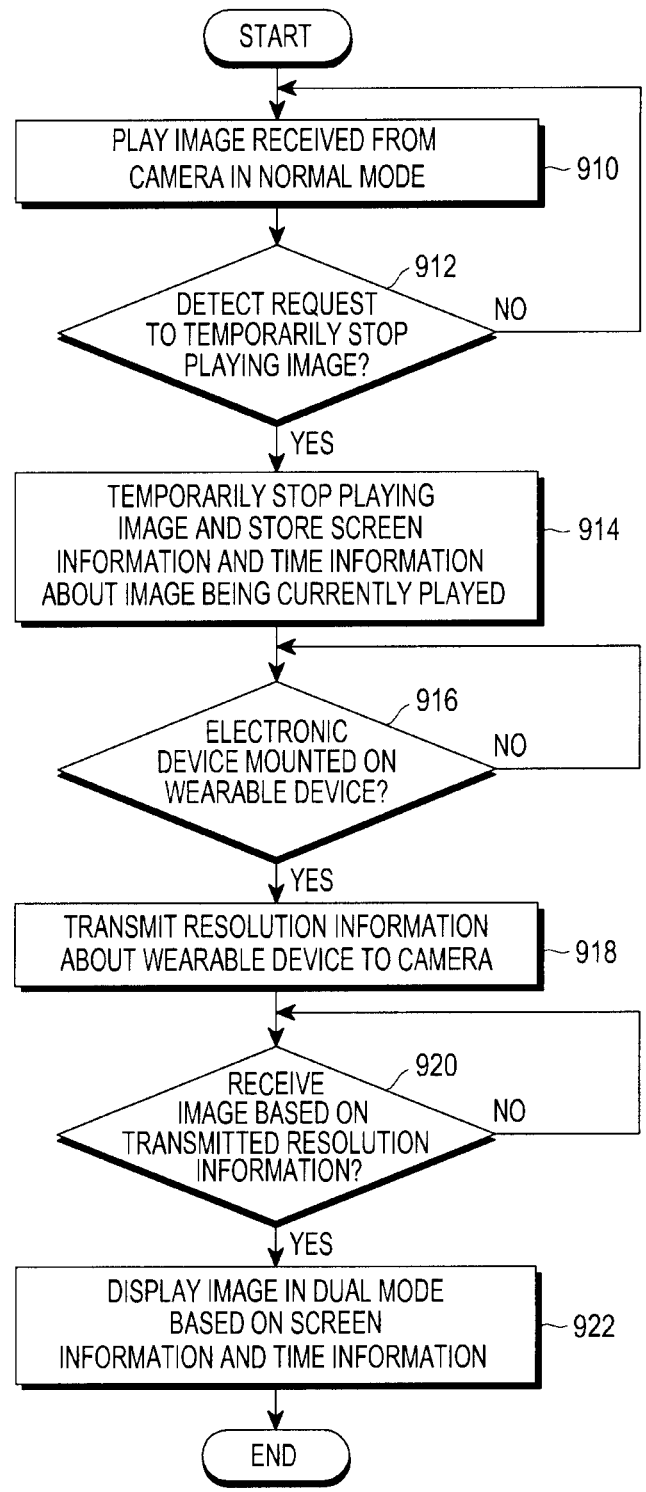
FIG. 9 is a flowchart illustrating a process for displaying an image by an electronic device detachably coupled to a wearable device according to an embodiment of the present disclosure.

FIG. 9 is a flowchart illustrating a process for displaying an image by an electronic device detachably coupled to a wearable device according to an embodiment of the present disclosure.

Now described in detail with reference to FIG. 9 is a process for displaying an image by an electronic device detachably coupled to a wearable device according to an embodiment of the present disclosure.

When an electronic device 101 is mounted on a wearable device while displaying an image in the normal mode, the screen information (e.g., field of view or "FOV") may be changed. In this case, the user may inconveniently be utilized to track the screen that used to be displayed before the electronic device is mounted on the wearable device, with the wearable device worn. FIG. 9 illustrates an example of a process for getting rid of such user inconvenience.

In operation 910, an electronic device 101 may display an image received from a camera in a normal mode. The electronic device 101 may receive an image captured by the camera 410 or pre-stored in the camera 410 and display the received image through the display 160. The image received from the camera 410 may include an image with a 360-degree view angle which is captured in real-time by the camera 410 or an image pre-stored in a memory (not shown) of the camera 410. The electronic device 101 may receive the image from the camera 410 in a streaming manner and display the image through the display 160.

In operation 912, the electronic device 101 may detect an input and in response, temporarily stop the image being displayed. The electronic device 101 may detect an input including a touch, tap, double tap, long press, or shake on the display 160 to temporarily terminate the image being displayed. The electronic device 101 may receive an input to temporarily terminate the image being displayed through an application for displaying images in the normal mode.

In operation 914, the electronic device 101 may temporarily stop the image being displayed and store at least one of screen information and time information for the image being currently displayed. Upon detecting the input for temporarily stopping the image displayed in the normal mode, the electronic device 101 may temporarily stop the image being displayed and store at least one of screen information (e.g., FOV) and time information (e.g., time displayed) about the stopped image in the memory 130. At least one of the screen information (e.g., FOV) and time information (e.g., time displayed) may be used to re-display the image and maintain a degree of continuity after the electronic device 101 is mounted on the wearable device 420. The electronic device 101 may store, in the memory 130, the screen information or time information and also other various information utilized for continuously displaying the prior image, which used to be displayed before the electronic device 101 is mounted on the wearable device 420, after mounting the electronic device 101 on the wearable device 420.

In operation 916, the electronic device 101 may detect whether the electronic device 101 is mounted on a wearable device. As an external device connector 601 of the electronic device 101 is electrically connected to a connector 602 of the wearable device 420, the electronic device 101 may detect that the electronic device 101 is mounted on the wearable device 420 and may communicate with the wearable device 420 through the external device connector 601.

In operation 918, the electronic device 101 may transmit resolution information of the wearable device to the camera. Upon sensing the mounting on the wearable device, the electronic device 101 may obtain resolution information from the wearable device 420. The electronic device 101 may transmit the obtained resolution information of the wearable device to the camera 410. The electronic device 101 may transmit wearable device information including resolution information including various resolutions that the wearable device 420 may support or display images in to the camera 410. The wearable device information may include various pieces of information utilized to directly receive images from the camera 410, such as the resolution information, product information about the wearable device, function information, or prefix information of a communication interface for transmission or reception of images.

In operation 920, the electronic device 101 may receive images based on the transmitted resolution information. The electronic device 101 may transmit the wearable device information including the resolution information of the wearable device 420 to the camera 410 and may receive an image based on the transmitted resolution information from the camera 410. The camera 410 may determine an optimal resolution for displaying an image through the wearable device 420 based on at least one of the received resolution information, wearable device product information, function information, and prefix information of communication interface for transmission/reception of images. The camera 410 may transmit an image based on the determined resolution to the electronic device 101. The electronic device 101 may receive, from the camera 410, an image corresponding to the resolution determined based on the transmitted resolution information. The received image may be an image having the optimal resolution for display on the wearable device 420.

In operation 922, the electronic device 101 may display the received image in the dual mode based on the stored screen information and time information. The electronic device 101 may display the received image in the dual mode based on at least one of the screen information and time information stored. Upon transmitting the resolution information to the camera 410 or receiving an image with the optimal resolution, the electronic device 101 may execute an application utilized for displaying the received image in the dual mode. The electronic device 101 may display the received image through the executed application. The electronic device 101 may convert the received image to be displayed based on the HMT mode. The electronic device 101 may display a left-eye image 710 and a right-eye image 720 for the converted image on the display 160 based on at least one of the screen information and time information stored. The left-eye image 710 may correspond to the left eye 740, and the right-eye image 720 may correspond to the right eye 750. According to an embodiment of the present disclosure, the left-eye image 710 and the right-eye image 720 may be images for a VR service and may be images configured to provide a stereoscopic effect for a portion of an overall screen for a VR service. For example, the left-eye image 710 and the right-eye image 720 may be formed to be different from each other to present a depth perception effect. The user may observe an illusion of depth perception as she observes different images through her eyes. As set forth above, upon sensing an input to temporarily terminate the image being displayed while displaying the image received from the camera 410 in the normal mode, the electronic device 101 may temporarily stop the image being displayed. The electronic device 101 may store at least one of the screen information and display time information about the current screen of the stopped image, execute an application for displaying the image received from the camera 410 in the dual mode using at least one of the screen information and display time information stored, and display the received image in the dual mode through the executed application. The electronic device 101 may store the screen information about the image in the memory 130 while displaying the image received from the camera 410 in the normal mode, and when mounted on the wearable device 420, the electronic device 101 may generate, based on screen information about a first image stored, a second image corresponding to the view point of the first image and display the generated second image through the display 160. The view point may include at least one of the focus, direction, angle of view, and screen size of the image.

According to an embodiment of the present disclosure, a method for displaying an image by an electronic device detachably mounted on a wearable device may include displaying a first image through a display, storing screen information about the first image in a memory, sensing whether the electronic device is mounted on the wearable device, generating a second image corresponding to a view point of the first image based on the stored screen information about the first image, and displaying the generated second image through the display.

According to an embodiment of the present disclosure, storing the screen information about the first image in the memory may include temporarily stopping displaying the first image based on sensing an input to temporarily terminate the first image being displayed while displaying the first image in a first mode and storing the screen information about the first image temporarily stopped.

According to an embodiment of the present disclosure, the method may further include, when the electronic device is mounted on the wearable device, converting the first image into the second image based on the stored screen information to be displayed in a second mode. The first mode may be a mode for displaying the image in a single mode, and the second mode may be a mode for displaying the image in a dual mode.

According to an embodiment of the present disclosure, displaying the generated second image through the display may include displaying the second image having a view point corresponding to the view point of the first image using the screen information. The screen information may include a time of display of the first image, coordinates of a center of the first image temporarily stopped, or a combination thereof.

According to an embodiment of the present disclosure, the method may further include obtaining resolution information about the wearable device from the wearable device based on the mounting of the electronic device on the wearable device and transmitting the obtained resolution information to an external camera.

According to an embodiment of the present disclosure, the method may further include receiving an image from the external camera based on the transmitted resolution information, converting the received image into a 3D image, executing an application for displaying the converted image, and displaying the received image in 3D using the executed application.

According to an embodiment of the present disclosure, the method may further include connecting the electronic device with the wearable device, transmitting wearable device information including resolution information about the wearable device received from the wearable device to an external camera, and based on receiving the wearable device information-based image from the external camera, transmitting the received image to the wearable device.

According to an embodiment of the present disclosure, the method may further include releasing the temporary stopping of the first image based on sensing a movement of the wearable device after the wearable device is worn on a user's head with the first image temporarily stopped.

According to an embodiment of the present disclosure, a method for displaying an image by an electronic device detachably mounted on a wearable device when attached or removed from the wearable device may include displaying an image received from an external camera in a normal mode, stopping the display in the normal mode and transmitting resolution information about the wearable device to the external camera based on the mounting on the wearable device, and displaying the received image based on the transmitted resolution in a dual mode.

Figure 10A:
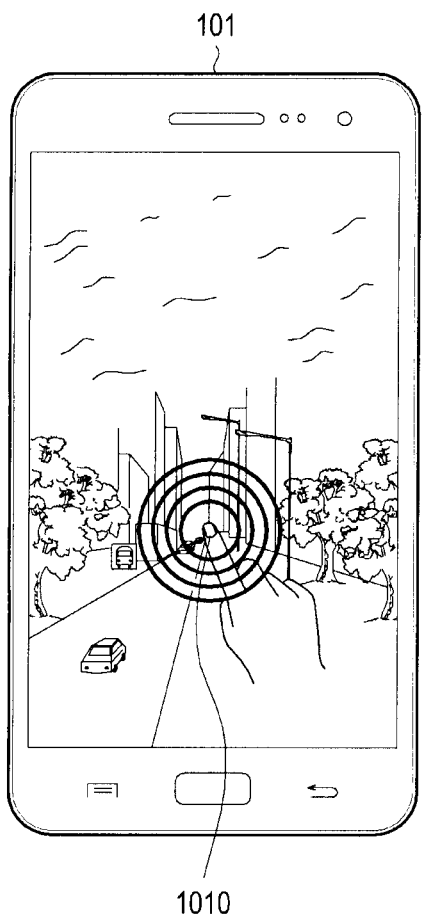
FIG. 10A is a view illustrating an example of entering a touch on a display to temporarily terminate an image that is being displayed in a normal mode by an electronic device according to an embodiment of the present disclosure.
Figure 10B:
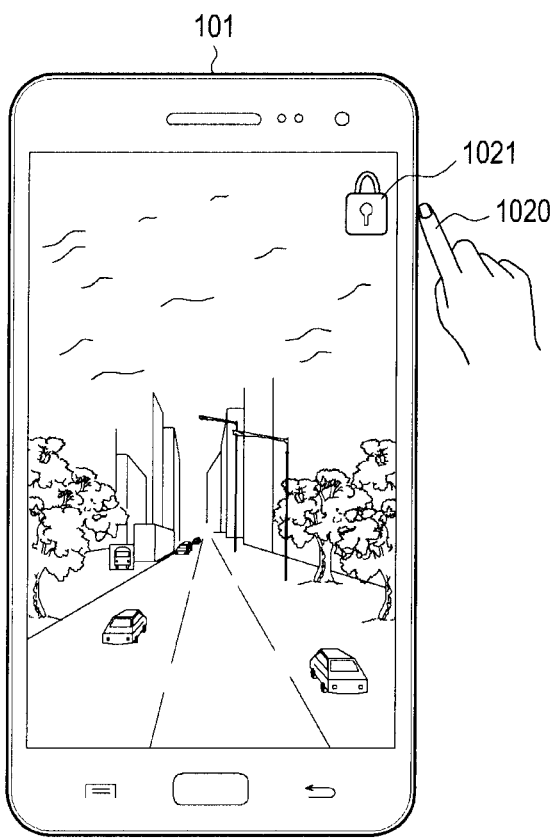
FIG. 10B is a view illustrating an example of entering an input to stop an image, which is being displayed in a normal mode by an electronic device, through a power button according to an embodiment of the present disclosure.
Figure 10C:
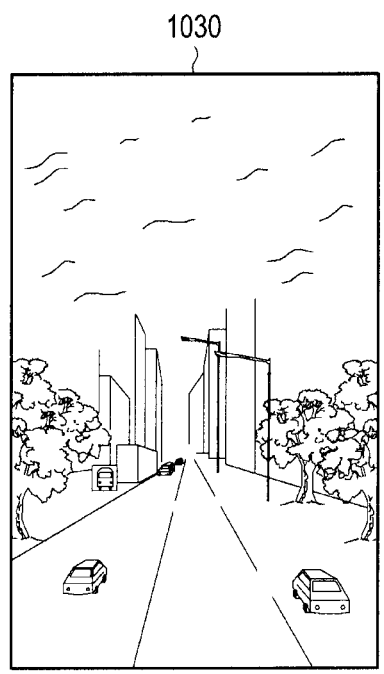
FIG. 10C is a view illustrating an example of a screenshot for an image being displayed in a normal mode by an electronic device according to an embodiment of the present disclosure.
Figure 10D:
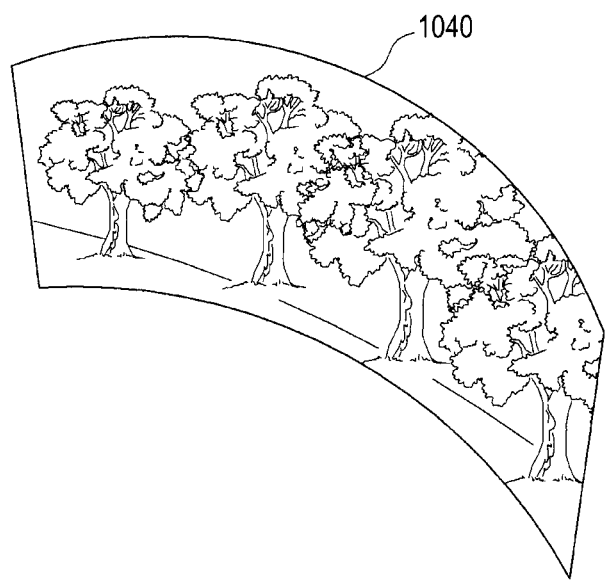
FIG. 10D is a view illustrating an example of a screenshot for an image when screen information is not used after an electronic device is mounted on a wearable device according to an embodiment of the present disclosure.

FIG. 10A is an illustrative example view for entering a touch input on a display to temporarily terminate an image that is being displayed in a normal mode by an electronic device, according to an embodiment of the present disclosure. FIG. 10B is a view illustrating an example of entering an input to stop an image, which is being displayed in a normal mode by an electronic device, through a power button according to an embodiment of the present disclosure. FIG. 10C is a view illustrating an example of a screenshot for an image being displayed in a normal mode by an electronic device according to an embodiment of the present disclosure. FIG. 10D is a view illustrating an example of a screenshot for an image when screen information is not used after an electronic device is mounted on a wearable device according to an embodiment of the present disclosure.

Referring to FIGS. 10A and 10B, the electronic device 101 may temporarily stop an image being displayed in the normal mode. Upon sensing an input 1010 on the display, the electronic device 101 may temporarily stop the image being displayed.

Upon sensing an input 1010 (e.g., a touch, tap, double tap, long press, or shake) on the display, the electronic device 101 may temporarily stop the image being currently displayed and store at least one of screen information (e.g., FOV) and time information (e.g., time displayed) about the image now temporarily stopped. At least one of the screen information and time information may be used to continuously display the prior image after the electronic device 101 is mounted on the wearable device 420. The electronic device 101 may store, in the memory 130, not only the screen information or time information but also other various information utilized for continuously displaying the prior image, which used to be displayed before the electronic device 101 is mounted on the wearable device 420, after mounting the electronic device 101 on the wearable device 420.

Upon sensing an input 1020 through a button (e.g., a power button) formed on the outer surface of the electronic device 101, the electronic device 101 may temporarily stop the image being currently displayed and store at least one of screen information (e.g., FOV) and time information (e.g., time displayed) about the image now temporarily stopped. The electronic device 101 may display, on the display, a lock icon 1021 indicating that the display of the image has been temporarily stopped. Such lock may be released when the user moves who wears the electronic device 101-mounted wearable device.

Referring to FIGS. 10C and 10D, when the electronic device 101 does not store the screen information although sensing an input to temporarily terminate the image being displayed in the normal mode as shown in FIG. 10c, a different screen from that of FIG. 10C may be displayed as shown in FIG. 10D. In such case, the user wearing the electronic device 101-mounted wearable device is utilized to move her body part (e.g., head) to track the screen as shown in FIG. 10C, causing user inconvenience. To release such inconvenience according to an embodiment of the present disclosure, upon sensing an input to position the image being displayed, the screen information about the current screen, e.g., the one shown in FIG. 10C, may be stored, and when the electronic device 101 is mounted on the wearable device or the user wears the wearable device, the stored screen information about the current screen, e.g., that shown in FIG. 10C, may be used to allow the user to seamlessly view the image.

Figure 11:
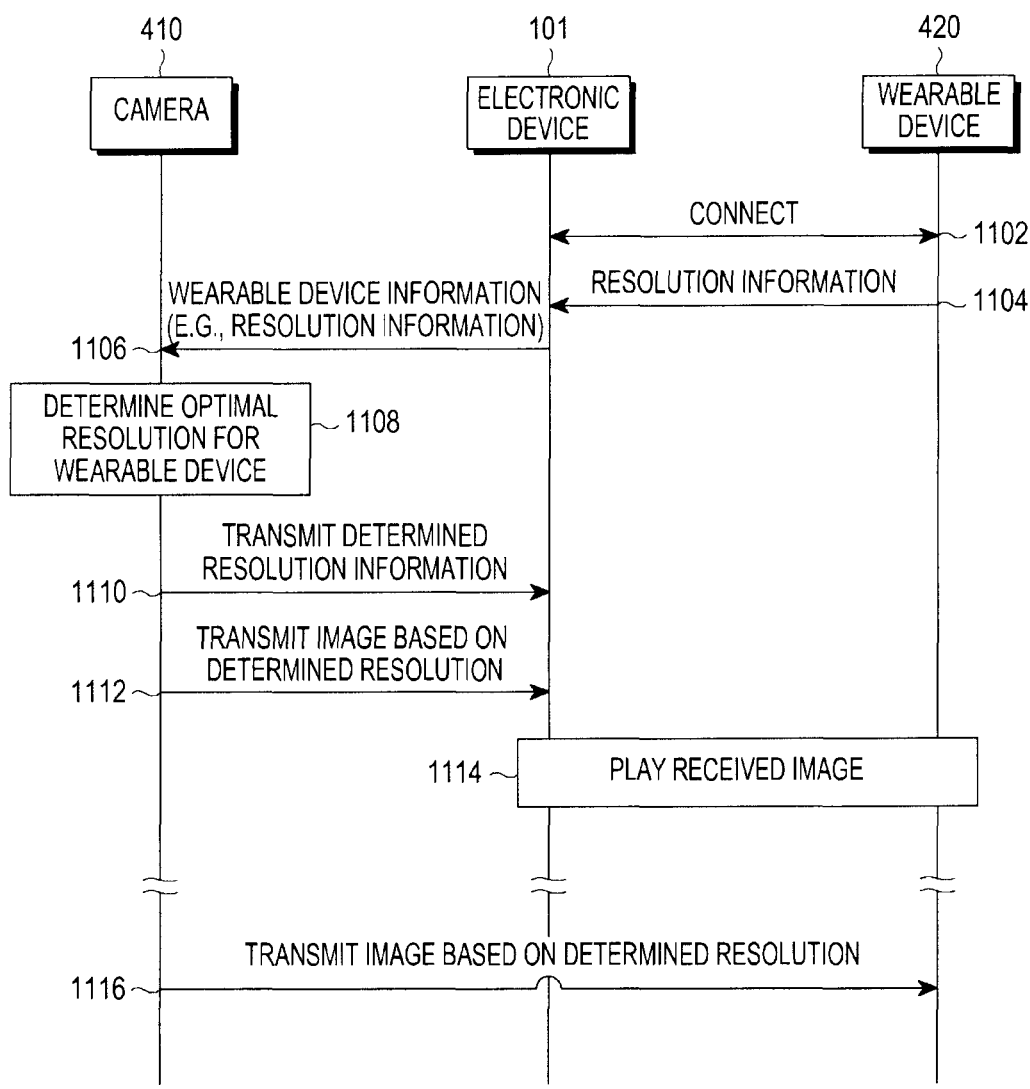
FIG. 11 is a flowchart illustrating operations of a system including a camera, a wearable device, and an electronic device to display an image according to an embodiment of the present disclosure.

FIG. 11 is a flowchart illustrating operations of a system including a camera, a wearable device, and an electronic device to display an image according to an embodiment of the present disclosure.

Now described are operations of a camera, a wearable device, and an electronic device to display an image according to an embodiment of the present disclosure.

In operation 1102, the electronic device 101 may connect with the wearable device 420. The electronic device 101 may wirelessly connect to the wearable device 420 through a short-range communication scheme (e.g., Wi-Fi, bluetooth, or NFC). The electronic device 101 and the wearable device 420 may include a communication interface for wirelessly transmitting and receiving signals or data.

In operation 1104, the electronic device 101 may receive resolution information from the wearable device 420. When the electronic device 101 is connected with the wearable device 420, the electronic device 101 may send a request for resolution information of the wearable device 420 to the wearable device 420 and receive the resolution information corresponding to the request. The electronic device 101 may send a request for wearable device information to the wearable device 420 and receive wearable device information from the wearable device 420 corresponding to the request. The wearable device information may include various pieces of information utilized to directly receive images from the camera 410, such as the resolution information, product information about the wearable device, function information, or prefix information of a communication interface for transmission or reception of images.

In operation 1106, the electronic device 101 may transmit the wearable device information to the camera 410. The electronic device 101 may transmit the wearable device information including the resolution information about the wearable device to the camera 410. The electronic device 101 may transmit the resolution information obtained from the wearable device 420 to the camera 410. The electronic device 101 may transmit wearable device information including resolution information including various resolutions that the wearable device 420 may support or display images in to the camera 410.

In operation 1108, the camera 410 may determine an optimal resolution associated with the wearable device. The camera 410 may receive the wearable device information including the resolution information about the wearable device 420 from the electronic device 101. The camera 410 may receive information about various resolutions that the wearable device supports from the electronic device 101 or directly from the wearable device 420. The camera 410 may determine the optimal resolution for display by the wearable device 420 based on the received resolution information.

In operation 1110, the camera 410 may transmit the determined resolution information to the electronic device 101. The camera 410 may include a communication interface (not shown) for transmission or reception of signals or data to/from the electronic device 101 and/or the wearable device 420. The camera 410 may transmit the determined resolution information to the electronic device 101 through the communication interface (not shown).

In operation 1112, the camera 410 may transmit an image according to the determined resolution to the electronic device 101. After transmitting the determined resolution information to the electronic device 101 through the communication interface (not shown), the camera 410 may transmit an image based on the determined resolution to the electronic device 101. The camera 410 may capture in real-time an image based on the optimal resolution determined in operation 1108 and transmit the captured image to the electronic device 101.

In operation 1114, the electronic device 101 may display the image received from the camera 410 through the wearable device 420. The electronic device 101 may output, on the display 1600, the image captured in real-time based on the resolution determined in operation 1112, thereby allowing the user wearing the wearable device 420 to view the image outputted on the display 160.

In operation 1116, the camera 410 may continue to transmit images based on the determined resolution to the wearable device 420. According to an embodiment of the present disclosure, the camera 410 may transmit the image based on the determined resolution to the electronic device 101 or directly to the wearable device 420. The wearable device 420 may include a processor (not shown) for displaying the received image, a memory (not shown) for storing an application for displaying images, and a communication interface (not shown) for receiving the image from the camera 410.

Figure 12:
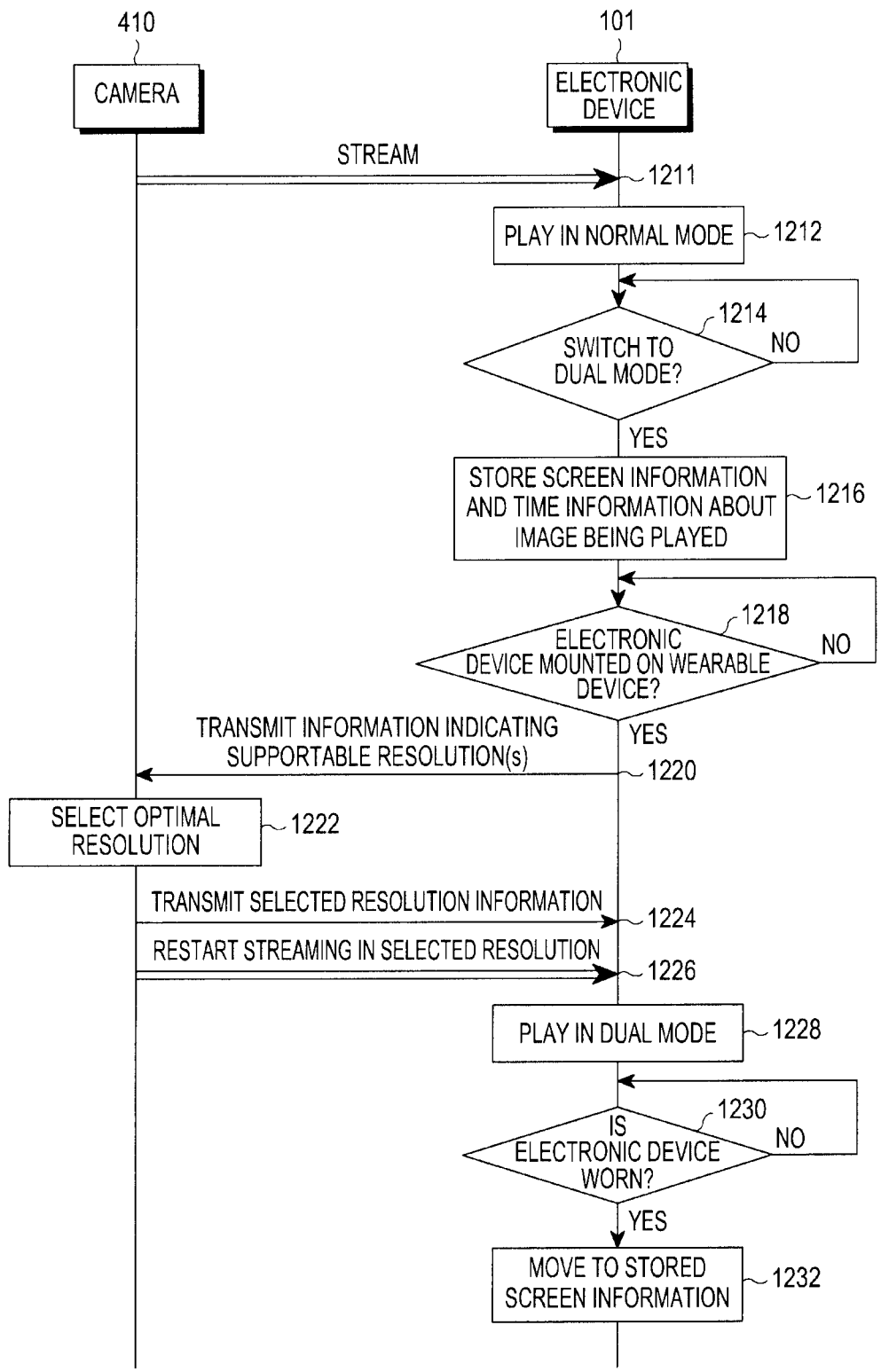
FIG. 12 is a flowchart illustrating a process for switching from a normal mode to a dual mode to continuously display streaming data received from a camera while an electronic device displays the streaming data in the normal mode.

FIG. 12 is a flowchart illustrating a process for switching from a normal mode to a dual mode to continuously display streaming data received from a camera while an electronic device displays the streaming data in the normal mode.

Now described in detail with reference to FIG. 12 is a process for switching from a normal mode to a dual mode to continuously display streaming data received from a camera while an electronic device displays the streaming data in the normal mode.

In operation 1210, the electronic device 101 may receive streaming data from the camera 410. The electronic device 101 may receive in real-time an image being currently captured by the camera 410 in a streaming manner. The electronic device 101 may receive, in real-time, the image captured by the camera 410 and display the received image through the display 160. The image received from the camera 410 may include a 360-degree view angle image that is captured in real-time by the camera 410.

In operation 1212, the electronic device 101 may display the streaming data received in the normal mode. The electronic device 101 may display the received streaming data in the normal mode. The electronic device 101 may receive the image from the camera 410 in a streaming manner and display the image through the display 160.

In operation 1214, the electronic device 101 may switch into the dual mode. The electronic device 101 may switch into the dual mode while displaying the received streaming data in the normal mode. The electronic device 101 may switch from the normal mode to the dual mode corresponding to the user's request while displaying the received streaming data in the normal mode.

In operation 1216, the electronic device 101 may store screen information and time information about the image being displayed. Upon switching into the dual mode while displaying the received streaming data in the normal mode, the electronic device 101 may store the screen information and time information about the image being displayed. Upon sensing the switch into the dual mode, the electronic device 101 may temporarily stop the image being displayed and store at least one of the screen information and time information about the image being currently displayed. Upon sensing an input for temporarily stopping the image which is being displayed in the normal mode, the electronic device 101 may temporarily stop the image being displayed and store the screen information (e.g., FOV) and time information (e.g., time displayed) about the stopped image in the memory 130. At least one of the screen information and time information may be used to continuously display the prior image after the electronic device 101 is mounted on the wearable device 420.

In operation 1218, the electronic device 101 may sense being mounted on the wearable device. The electronic device 101 may sense whether the electronic device 101 is mounted on a wearable device. The wearable device 420 may be formed to have the electronic device 101 mounted thereon. As an external device connector 601 of the electronic device 101 is electrically connected to a connector 602 of the wearable device 420, the electronic device 101 may sense that the electronic device 101 is mounted on the wearable device 420 and may communicate with the wearable device 420 through the external device connector 601.

In operation 1220, the electronic device 101 may transmit information about resolutions that the electronic device 101 supports to the camera 410. The electronic device 101 may transmit information about various resolutions that the electronic device 101 may display in to the camera 410. The resolution information may include various pieces of information utilized to directly receive images from the camera 410, such as product information about the wearable device, function information, or prefix information of a communication interface for transmission or reception of images.

In operation 1222, the camera 410 may select an optimal resolution. The camera 410 may determine the optimal resolution fitting the electronic device 101 or the wearable device 420. The camera 410 may receive information including the resolution information from the electronic device 101. The camera 410 may receive information about various resolutions that the wearable device supports from the electronic device 101 or directly from the wearable device 420. The camera 410 may determine the optimal resolution for display by the electronic device 101 based on the received resolution information.

In operation 1224, the electronic device 101 may receive the selected resolution information. The camera 410 may transmit the determined resolution information to the electronic device 101. The camera 410 may include a communication interface (not shown) for transmission or reception of signals or data to/from the electronic device 101 and/or the wearable device 420. The camera 410 may transmit the determined resolution information to the electronic device 101 through the communication interface (not shown).

In operation 1226, the electronic device 101 may receive, from the camera 410, streaming data fitting the selected resolution. The camera 410 may transmit an image based on the determined resolution to the electronic device 101. After transmitting the determined resolution information to the electronic device 101 through the communication interface (not shown), the camera 410 may transmit an image based on the determined resolution to the electronic device 101. The camera 410 may capture in real-time an image based on the optimal resolution determined in operation 1222 and transmit the captured image to the electronic device 101. The electronic device 101 may receive the image based on the resolution determined by the camera 410 from the camera 410. The electronic device 101 may receive streaming data captured based on the optimal resolution (or converted into the optimal resolution) from the camera 410.

In operation 1228, the electronic device 101 may display the streaming data being received in the dual mode. The electronic device 101 may display the received streaming data in the dual mode. Upon receiving the streaming data with the optimal resolution, the electronic device 101 may execute an application utilized for displaying the received streaming data in the dual mode. The electronic device 101 may display the received streaming data through the executed application. The electronic device 101 may convert the received streaming data to be displayed based on the dual mode. The electronic device 101 may display a left-eye image 710 and a right-eye image 720 on the display 160 based on the converted streaming data. According to an embodiment of the present disclosure, the left-eye image 710 and the right-eye image 720 may be images for a VR service and may be images configured to provide a stereoscopic effect for a portion of an overall screen for a VR service. As set forth above, when the electronic device 101 is mounted on the wearable device 420 while displaying the streaming data received from the camera 410 in the normal mode, the electronic device 101 may execute an application for displaying the streaming data in the dual mode and display the received streaming data through the executed application.

In operation 1230, the electronic device 101 may determine whether the electronic device 101-mounted wearable device is worn on the user. The electronic device 101 may determine whether the wearable device is worn on the user based on a movement of the wearable device.

In operation 1232, the electronic device 101 may move to the stored screen information. The electronic device 101 may display the received streaming data in the dual mode based on the stored screen information. The electronic device 101 may execute an application for displaying the streaming data received from the camera 410 in the dual mode using the stored screen information and display the received streaming data in the dual mode through the executed application. The screen information may include various pieces of information utilized for continuously displaying the pre-mounting streaming data after the electronic device 101 is mounted on the wearable device 420. The electronic device 101 may store the screen information about the streaming data in the memory 130 while displaying the streaming data received from the camera 410 in the normal mode, and when mounted on the wearable device 420, the electronic device 101 may display the streaming data through the display 160 based on the stored streaming data screen information. The view point may include at least one of the focus, direction, angle of view, and screen size of the image.

Figure 13:
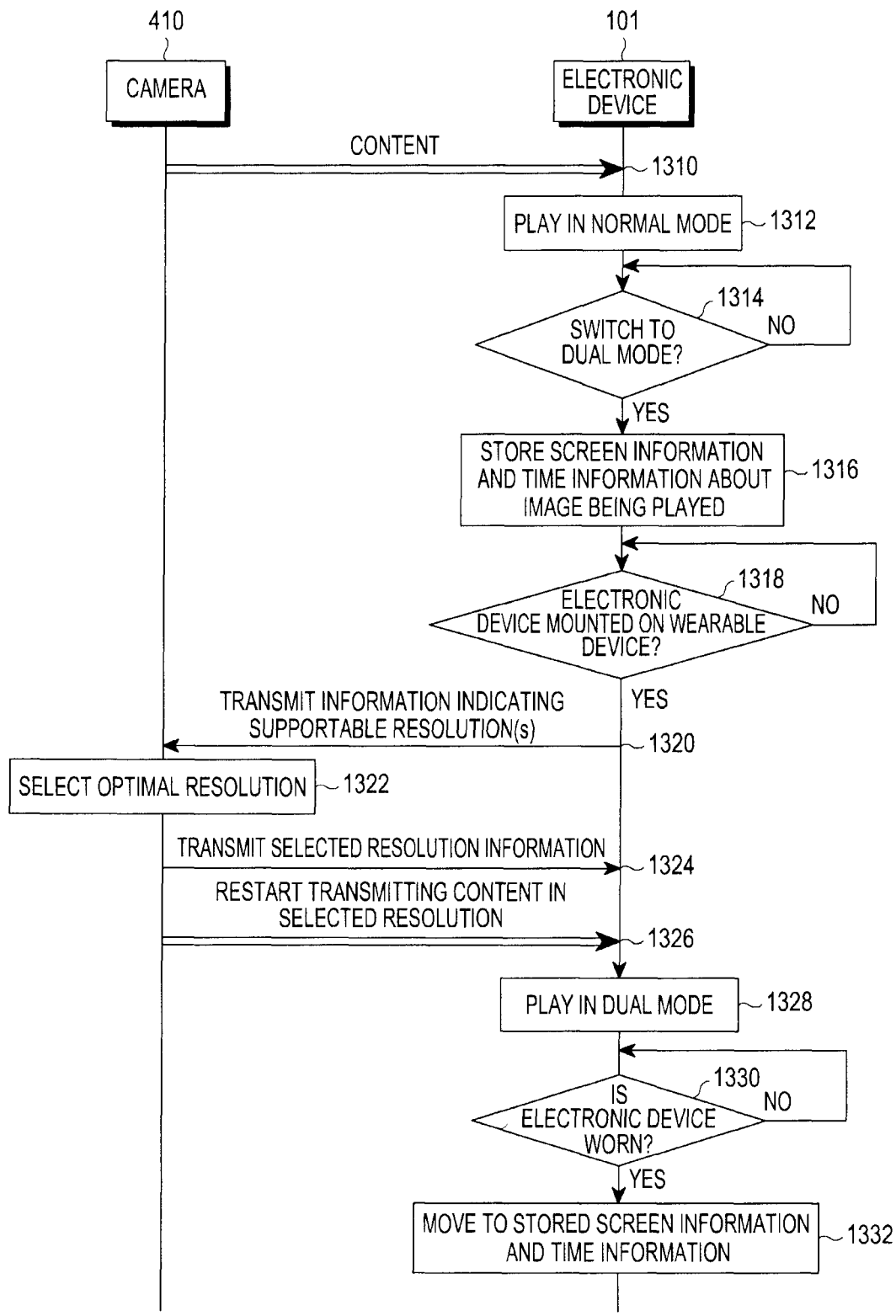
FIG. 13 is a flowchart illustrating a process for switching from a normal mode to a dual mode to continuously display content received from a camera while an electronic device displays the content in the normal mode.

FIG. 13 is a flowchart illustrating a process for switching from a normal mode to a dual mode to continuously display content received from a camera while an electronic device displays the content in the normal mode.

Now described in detail with reference to FIG. 13 is a process for switching from a normal mode to a dual mode to continuously display content received from a camera while an electronic device displays the content in the normal mode.

In operation 1310, the electronic device 101 may receive content from the camera 410. The electronic device 101 may receive content pre-stored in the camera 410. The electronic device 101 may receive content pre-stored in the camera 410 and display the received content through the display 160. The content may include an image captured and pre-stored by the camera 410.

In operation 1312, the electronic device 101 may display the received content in the normal mode. The electronic device 101 may display the received content in the normal mode. The electronic device 101 may receive content from the camera 410 and display the content through the display 160.

In operation 1314, the electronic device 101 may switch into the dual mode. The electronic device 101 may switch into the dual mode while displaying the received content in the normal mode. The electronic device 101 may switch from the normal mode to the dual mode corresponding to the user's request while displaying the received content in the normal mode.

In operation 1316, the electronic device 101 may store screen information and time information about the image being displayed. Upon switching into the dual mode while displaying the received content in the normal mode, the electronic device 101 may store the screen information and time information about the content being displayed. Upon sensing the switch into the dual mode, the electronic device 101 may temporarily stop the content being displayed and store at least one of the screen information and time information about the content being currently displayed. Upon sensing an input for temporarily stopping the content which is being displayed in the normal mode, the electronic device 101 may temporarily stop the content being displayed and store the screen information (e.g., FOV) and time information (e.g., time displayed) about the stopped content in the memory 130. At least one of the screen information and time information may be used to continuously display the prior content after the electronic device 101 is mounted on the wearable device 420.

In operation 1318, the electronic device 101 may sense being mounted on the wearable device. The electronic device 101 may sense whether the electronic device 101 is mounted on a wearable device. The wearable device 420 may be formed to have the electronic device 101 mounted thereon. As an external device connector 601 of the electronic device 101 is electrically connected to a connector 602 of the wearable device 420, the electronic device 101 may sense that the electronic device 101 is mounted on the wearable device 420 and may communicate with the wearable device 420 through the external device connector 601.

In operation 1320, the electronic device 101 may transmit information about resolutions that the electronic device 101 supports to the camera 410. The electronic device 101 may transmit information about various resolutions that the electronic device 101 may display in to the camera 410. The resolution information may include various pieces of information utilized to directly receive images from the camera 410, such as product information about the wearable device, function information, or prefix information of a communication interface for transmission or reception of images.

In operation 1322, the camera 410 may select an optimal resolution. The camera 410 may determine the optimal resolution fitting the electronic device 101 or the wearable device 420. The camera 410 may receive information including the resolution information from the electronic device 101. The camera 410 may receive information about various resolutions that the wearable device supports from the electronic device 101 or directly from the wearable device 420. The camera 410 may determine the optimal resolution for display by the electronic device 101 based on the received resolution information.

In operation 1324, the electronic device 101 may receive the selected resolution information. The camera 410 may transmit the determined resolution information to the electronic device 101. The camera 410 may include a communication interface (not shown) for transmission or reception of signals or data to/from the electronic device 101 and/or the wearable device 420. The camera 410 may transmit the determined resolution information to the electronic device 101 through the communication interface (not shown).

In operation 1326, the electronic device 101 may receive, from the camera 410, content fitting the selected resolution. The camera 410 may transmit content based on the determined resolution to the electronic device 101. After transmitting the determined resolution information to the electronic device 101 through the communication interface (not shown), the camera 410 may transmit content based on the determined resolution to the electronic device 101. The camera 410 may capture in real-time content based on the optimal resolution determined in operation 1322 and transmit the captured content to the electronic device 101. The electronic device 101 may receive the content based on the resolution determined by the camera 410 from the camera 410. The electronic device 101 may receive content captured based on the optimal resolution (or converted into the optimal resolution) from the camera 410.

In operation 1328, the electronic device 101 may display the content being received in the dual mode. The electronic device 101 may display the received content in the dual mode. Upon receiving the content with the optimal resolution, the electronic device 101 may execute an application utilized for displaying the received content in the dual mode. The electronic device 101 may display the received content through the executed application. The electronic device 101 may convert the received content to be displayed based on the dual mode. The electronic device 101 may display a left-eye image 710 and a right-eye image 720 on the display 160 based on the converted content. According to an embodiment of the present disclosure, the left-eye image 710 and the right-eye image 720 may be images for a VR service and may be images configured to provide a stereoscopic effect for a portion of an overall screen for a VR service. As set forth above, when the electronic device 101 is mounted on the wearable device 420 while displaying the content received from the camera 410 in the normal mode, the electronic device 101 may execute an application for displaying the content in the dual mode and display the received content through the executed application.

In operation 1330, the electronic device 101 may determine whether the electronic device 101-mounted wearable device is worn on the user. The electronic device 101 may determine whether the wearable device is worn on the user based on a movement of the wearable device.

In operation 1332, the electronic device 101 may move to the stored screen information. The electronic device 101 may display the received content in the dual mode based on the stored screen information. The electronic device 101 may execute an application for displaying the content received from the camera 410 in the dual mode using the stored screen information and display the received content in the dual mode through the executed application. The screen information may include various pieces of information utilized for continuously displaying the pre-mounting content after the electronic device 101 is mounted on the wearable device 420. The electronic device 101 may store the screen information about the content in the memory 130 while displaying the content received from the camera 410 in the normal mode, and when mounted on the wearable device 420, the electronic device 101 may display the content through the display 160 based on the stored content screen information. The view point may include at least one of the focus, direction, angle of view, and screen size of the image.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module as used herein may include at least one of Application Specific Integrated Circuit (ASIC) chips, Field Programmable Gate Arrays (FPGAs), or Programmable Logic Arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a programming module. The instructions, when executed by a control circuit, may enable the processor to carry out their respective corresponding functions. The computer-readable storage medium may be e.g., the memory 130. At least a part of the programming module may be implemented (e.g., executed) by e.g., a control circuit. At least a part of the programming module may include e.g., a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out example embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). According to an embodiment of the present disclosure, there is provided a storage medium storing commands, the commands including, in a method for displaying an image by an electronic device detachably mounted on a wearable device, a first command set displaying a first image through a display, a second command set storing screen information about the first image in a memory, a third command set sensing whether the electronic device is mounted on the wearable device, a fourth command set generating a second image having the same view point as the first image based on the stored screen information about the first image, and a fifth command set displaying the generated second image through the display.

As is apparent from the foregoing description, according to various embodiments of the present disclosure, there are provided an electronic device and method for displaying images. Images fitting the resolution of the wearable device may be received from the camera and displayed through the wearable device. Images may be seamlessly displayed merely by putting the electronic device on the wearable device without the need for a separate input. Further, images which used to be displayed in the normal mode may continuously be displayed in the dual mode.

The embodiments herein are provided merely for better understanding of the present disclosure, and the present disclosure should not be limited thereto or thereby. It should be appreciated by one of ordinary skill in the art that various changes in form or detail may be made to the embodiments without departing from the present disclosure defined by the following claims.

What is claimed is:

1. An electronic device detachably mountable on a wearable device, the electronic device comprising:
   a display;
   a memory; and
   at least one processor electrically connected with the display and the memory, the at least one processor is configured to:
   control the display to display a first FOV (field of view) of a first image at a first mode,
   receive an input on the display of the electronic device while the first image is displayed at the first mode,
   store screen information associated with the first image in the memory, wherein the screen information includes a time of the first image and coordinates indicating a viewing position within the first image when the input was received,
   detect the electronic device being mounted on the wearable device, and control the display to display a second FOV of a second image corresponding to a view point of the first image based on the time and/or the coordinates at a second mode in response to the detecting.

2. The electronic device of claim 1, wherein the at least one processor is further configured to:
temporarily terminate display of the first image in response to the input.

3. The electronic device of claim 1,
wherein the first mode includes display of the first image in a single mode, and the second mode includes display of the second image in a dual mode.

4. The electronic device of claim 2, wherein while the display of the first image is temporarily terminated, the screen information is stored.

5. The electronic device of claim 1, wherein the at least one processor is further configured to:
obtain resolution information associated with the wearable device responsive to detecting mounting of the electronic device on the wearable device, and
transmit the obtained resolution information to an external camera.

6. The electronic device of claim 5, wherein the at least one processor is further configured to:
receive a third image captured by the external camera according to the obtained resolution information, and
execute an application to display the received third image in a three-dimensional (3D) display mode on the display.

7. The electronic device of claim 5, wherein the external camera captures images with a 360-degree viewing angle, and
wherein the first image is captured in real-time by the external camera, or is pre-stored in the external camera.

8. The electronic device of claim 1, further comprising:
a communication module,
wherein the at least one processor is further configured to:
maintain by the communication module a connection between the electronic device and the wearable device,
receive image information associated with the wearable device from the wearable device,
transmit the received image information associated with the wearable device to an external camera,
receive an image from the external camera, the image captured by the external camera according to the transmitted image information, and
transmit the received image to the wearable device.

9. The electronic device of claim 8, wherein the image information further includes a command enabling the received image to be directly transmitted to the wearable device, and enabling the image information about the wearable device to be transmitted to the external camera.

10. The electronic device of claim 1, wherein the input includes at least one of selection of a power key, a touch contact to the display, and a selection of a menu generated by an application executing display of the first image.

11. The electronic device of claim 1, wherein the at least one processor is configured to:
while display of the first image is temporarily terminated, detecting movement indicating that the wearable device is worn, and
in response to detecting the movement indicating that the wearable device is worn, release temporary termination of display of the first image.

12. A method in an electronic device mountable on a wearable device, the method comprising:

displaying a first FOV (field of view) of a first image at a first mode through a display;
receiving an input on the display of the electronic device while the first image is displayed at the first mode;
storing screen information associated with the first image in response to the input, wherein the screen information includes a time of the first image and coordinates indicating a viewing position within the first image when the input was received;
detecting the electronic device being mounted on the wearable device; and
displaying a second FOV of a second image corresponding to a view point of the first image based on the time and/or the coordinates at a second mode through the display in response to the detecting.

13. The method of claim 12, further comprising:
temporarily terminating display of the first image in response to the input.

14. The method of claim 12,
wherein a first mode includes display of the first image in a single mode, and a second mode includes display of the second image in a dual mode.

15. The method of claim 13, wherein while the display of the first image is temporarily terminated, the screen information is stored.

16. The method of claim 12, further comprising:
obtaining resolution information associated with the wearable device responsive to detecting mounting of the electronic device on the wearable device and transmitting the obtained resolution information to an external camera.

17. The method of claim 16, further comprising:
receiving a third image captured by the external camera according to the obtained resolution information; and
executing an application to display the received third image in a three-dimensional (3D) display mode on the display.

18. The method of claim 12, further comprising:
communicatively coupling the electronic device with the wearable device;
transmitting wearable device information including resolution information about the wearable device received from the wearable device to an external camera; and
responsive to receiving an image captured according to the wearable device information from the external camera, transmitting the received image to the wearable device.

19. The method of claim 12, further comprising
while display of the first image is temporarily terminated, detecting movement indicating that the wearable device is worn; and
in response to detecting the movement indicating that the wearable device is worn, releasing temporary termination of display of the first image.

20. A method in an electronic device detachably mounted on a wearable device, the method comprising:
displaying an image in a normal mode, the image received from an external camera;
in response to detecting mounting of the electronic device on the wearable device while the electronic device displays a first FOV field of view) of the image, terminating display of the image in the normal mode, storing screen information associated with the image, and transmitting resolution information about the wearable device to the external camera; and receiving another image based on the resolution information from the external camera for display in a dual mode, wherein the screen information includes at least one of: a time at which display of the image was temporarily terminated and coordinates indicating a viewing position within the image when display of the image was temporarily terminated, and wherein the other image is displayed based on the time and/or the coordinates.

\* \* \* \* \*

UNITED STATES PATENT AND TRADEMARK OFFICE
CERTIFICATE OF CORRECTION

PATENT NO.           : 10,681,340 B2
APPLICATION NO.      : 15/834270
DATED                : June 9, 2020
INVENTOR(S)          : Hee-Bae Park et al.

Page 1 of 1

It is certified that error appears in the above-identified patent and that said Letters Patent is hereby corrected as shown below:

In the Claims

Column 36, Claim 20, Line 63 should read as follows:
--...first FOV (field of view)...--

Signed and Sealed this
Seventh Day of July, 2020

Andrei Iancu
*Director of the United States Patent and Trademark Office*